United States Patent
Chang et al.

(10) Patent No.: US 8,913,330 B1
(45) Date of Patent: Dec. 16, 2014

(54) MOBILE DEVICE AND OPTICAL IMAGING LENS THEREOF

(71) Applicant: Genius Electronic Optical Co., Ltd., Cupertino, CA (US)

(72) Inventors: Kuo-Wen Chang, Taichung (CN); Poche Lee, Taichung (CN); Sheng Wei Hsu, Taichung (CN)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 14/289,449

(22) Filed: May 28, 2014

Related U.S. Application Data

(63) Continuation of application No. 13/617,231, filed on Sep. 14, 2012, now Pat. No. 8,773,767.

(30) Foreign Application Priority Data

Mar. 30, 2012  (TW) .............................. 101111443 A

(51) Int. Cl.
  *G02B 13/18*  (2006.01)
  *G02B 9/60*  (2006.01)
  *G02B 13/00*  (2006.01)

(52) U.S. Cl.
  CPC .............. *G02B 13/0045* (2013.01); *G02B 9/60* (2013.01)
  USPC ............................ 359/714; 359/763; 359/764

(58) Field of Classification Search
  CPC ....... G02B 13/0045; G02B 13/18; G02B 9/60
  USPC ......................................... 359/714, 763, 764
  See application file for complete search history.

(56) References Cited

U.S. PATENT DOCUMENTS

| | | | |
|---|---|---|---|
| 7,826,151 B2 | 11/2010 | Tsai | |
| 7,864,454 B1 | 1/2011 | Tang et al. | |
| 7,911,711 B1 | 3/2011 | Tang et al. | |
| 8,072,695 B1 | 12/2011 | Lee et al. | |
| 8,441,743 B2 | 5/2013 | Ohtsu | |
| 8,773,767 B2 | 7/2014 | Chang et al. | |

(Continued)

FOREIGN PATENT DOCUMENTS

| | | |
|---|---|---|
| TW | M368072 U1 | 11/2009 |
| TW | M369459 U1 | 11/2009 |
| TW | M369460 U1 | 11/2009 |

OTHER PUBLICATIONS

U.S. Appl. No. 14/289,462, filed May 28, 2014 by Chang et al., Unpublished.

(Continued)

*Primary Examiner* — Scott J Sugarman
(74) *Attorney, Agent, or Firm* — Kilpatrick Townsend & Stockton LLP

(57) ABSTRACT

Present embodiments provide for a mobile device and an optical imaging lens thereof. The optical imaging lens comprises five lens elements positioned in an order from an object side to an image side. Through controlling the convex or concave shape of the surfaces of the lens elements to allow the thickness of the second lens element and the sum of all air gaps between all five lens elements along the optical axis satisfying the relation: $0.20<T2<0.50$ (mm) and $0.27<(T2/G_{aa})<0.40$, the optical imaging lens shows better optical characteristics and the total length of the optical imaging lens is shortened.

17 Claims, 33 Drawing Sheets

(56) References Cited

U.S. PATENT DOCUMENTS

| | | |
|---|---|---|
| 2010/0253829 A1 | 10/2010 | Shinohara |
| 2011/0013069 A1 | 1/2011 | Chen |
| 2011/0249346 A1 | 10/2011 | Tang et al. |
| 2011/0310287 A1 | 12/2011 | Ohtsu |
| 2013/0093938 A1* | 4/2013 | Otsu ............................ 348/345 |

OTHER PUBLICATIONS

Notice of Allowance for U.S. Appl. No. 13/617,231 mailed on Apr. 4, 2014, 8 pages.

* cited by examiner

| f(Focus)=3.42 mm, HFOV(Half angular field of view)=33.81 deg. | | | | | | |
|---|---|---|---|---|---|---|
| Surface# | | Radius | Thickness | Refractive index | Abbe number | Focus |
| - | Object | ∞ | 600 | | | |
| 100 | Aperture stop | ∞ | -0.19779 | | | |
| 110 | 1st lens element | 1.16525 | 0.41106 | 1.54593 | 56.11380 | 2.0996 |
| d1 | | -61.54625 | 0.10000 | | | |
| 120 | 2nd lens element | -14.51846 | 0.31000 | 1.64023 | 23.90087 | -3.2779 |
| d2 | | 2.47365 | 0.30361 | | | |
| 130 | 3rd lens element | 9.99164 | 0.34207 | 1.64023 | 23.90087 | 18.3089 |
| d3 | | 66.78500 | 0.28929 | | | |
| 140 | 4th lens element | -2.10475 | 0.47375 | 1.53635 | 56.27272 | 7.3984 |
| d4 | | -1.48336 | 0.37606 | | | |
| 150 | 5th lens element | 1.44909 | 0.35577 | 1.53635 | 56.27272 | -4.5032 |
| d5 | | 0.82807 | 0.44397 | | | |
| 160 | IR cut filter | ∞ | 0.30000 | 1.51827 | 64.16640 | |
| d6 | | ∞ | 0.24656 | | | |
| 170 | Image plane | ∞ | | | | |

FIG.3

| Aspherical parameters | | | | | |
|---|---|---|---|---|---|
| Surface# | 111 | 112 | 121 | 122 | 131 |
| K | 0.00E+00 | 0.00E+00 | 0.00E+00 | 0.00E+00 | 0.00E+00 |
| a4 | -6.46E-03 | -1.88E-01 | -2.78E-01 | -1.76E-01 | -3.27E-01 |
| a6 | 1.21E-02 | 9.44E-01 | 1.50E+00 | 8.96E-01 | -2.39E-01 |
| a8 | 1.59E-01 | -2.67E+00 | -4.09E+00 | -1.45E+00 | 2.18E+00 |
| a10 | -9.01E-01 | 4.14E+00 | 7.17E+00 | 7.76E-01 | -7.48E+00 |
| a12 | 1.90E+00 | -2.93E+00 | -7.01E+00 | 4.47E+00 | 1.16E+01 |
| a14 | -1.79E+00 | 0.00E+00 | 2.93E+00 | -1.01E+01 | -6.59E+00 |
| a16 | 0.00E+00 | 0.00E+00 | 0.00E+00 | 8.12E+00 | 0.00E+00 |
| a18 | 0.00E+00 | 0.00E+00 | 0.00E+00 | 0.00E+00 | 0.00E+00 |
| a20 | 0.00E+00 | 0.00E+00 | 0.00E+00 | 0.00E+00 | 0.00E+00 |
| Surface# | 132 | 141 | 142 | 151 | 152 |
| K | 0.00E+00 | 0.00E+00 | 0.00E+00 | -9.12E-01 | -9.86E-01 |
| a4 | -2.22E-01 | -1.50E-01 | -3.51E-01 | -1.14E+00 | -1.16E+00 |
| a6 | -2.53E-01 | -1.28E-01 | 1.06E+00 | 1.42E+00 | 1.77E+00 |
| a8 | 1.52E+00 | -2.66E-01 | -2.43E+00 | -1.11E+00 | -2.25E+00 |
| a10 | -3.12E+00 | 5.43E+00 | 4.42E+00 | 5.58E-01 | 2.25E+00 |
| a12 | 3.22E+00 | -1.39E+01 | -4.56E+00 | -1.75E-01 | -1.69E+00 |
| a14 | -1.24E+00 | 1.62E+01 | 2.58E+00 | 3.33E-02 | 9.30E-01 |
| a16 | 0.00E+00 | -9.60E+00 | -7.67E-01 | -4.41E-03 | -3.65E-01 |
| a18 | 0.00E+00 | 2.32E+00 | 9.54E-02 | 5.83E-04 | 9.84E-02 |
| a20 | 0.00E+00 | 0.00E+00 | 0.00E+00 | -5.43E-05 | -1.73E-02 |
| a22 | | | | | 1.78E-03 |
| a24 | | | | | -8.05E-05 |
| a26 | | | | | |
| a28 | | | | | |
| a30 | | | | | |

FIG.4

| f(Focus)=3.32 mm, HFOV(Half angular field of view)=34.66 deg. | | | | | | |
|---|---|---|---|---|---|---|
| Surface# | | Radius | Thickness | Refractive index | Abbe number | Focus |
| - | Object | ∞ | 600 | | | |
| 200 | Aperture stop | ∞ | -0.20001 | | | |
| 210 | 1st lens element | 1.16128 | 0.51296 | 1.54593 | 56.11379 | 2.09140 |
| d1 | | -57.35959 | 0.04591 | | | |
| 220 | 2nd lens element | 12.96664 | 0.25763 | 1.63941 | 23.33043 | -3.44680 |
| d2 | | 1.86914 | 0.32949 | | | |
| 230 | 3rd lens element | 27.71054 | 0.27660 | 1.64023 | 23.90087 | -161.68910 |
| d3 | | 21.77396 | 0.21186 | | | |
| 240 | 4th lens element | -2.44555 | 0.51796 | 1.53635 | 56.27272 | 5.22440 |
| d4 | | -1.40242 | 0.27711 | | | |
| 250 | 5th lens element | 1.37627 | 0.36291 | 1.53635 | 56.27272 | -4.86880 |
| d5 | | 0.81830 | 0.44397 | | | |
| 260 | IR cut filter | ∞ | 0.30000 | 1.51827 | 64.16641 | |
| d6 | | ∞ | 0.34976 | | | |
| 270 | Image plane | ∞ | | | | |

FIG.7

| Aspherical parameters | | | | | |
|---|---|---|---|---|---|
| Surface# | 211 | 212 | 221 | 222 | 231 |
| K | 0.00E+00 | 0.00E+00 | 0.00E+00 | 0.00E+00 | 0.00E+00 |
| a4 | 4.14E-03 | -1.73E-01 | -2.73E-01 | -1.31E-01 | -3.22E-01 |
| a6 | -7.39E-03 | 9.62E-01 | 1.44E+00 | 7.80E-01 | -3.03E-01 |
| a8 | 1.65E-01 | -2.65E+00 | -3.92E+00 | -1.25E+00 | 2.15E+00 |
| a10 | -9.01E-01 | 3.87E+00 | 6.73E+00 | 6.47E-01 | -7.37E+00 |
| a12 | 1.99E+00 | -3.03E+00 | -6.83E+00 | 5.02E+00 | 1.17E+01 |
| a14 | -1.84E+00 | 0.00E+00 | 2.38E+00 | -1.07E+01 | -6.43E+00 |
| a16 | 0.00E+00 | 0.00E+00 | 0.00E+00 | 8.13E+00 | 0.00E+00 |
| a18 | 0.00E+00 | 0.00E+00 | 0.00E+00 | 0.00E+00 | 0.00E+00 |
| a20 | 0.00E+00 | 0.00E+00 | 0.00E+00 | 0.00E+00 | 0.00E+00 |
| Surface# | 232 | 241 | 242 | 251 | 252 |
| K | 0.00E+00 | 0.00E+00 | 0.00E+00 | -1.00E+00 | -1.00E+00 |
| a4 | -2.42E-01 | -7.97E-02 | -3.42E-01 | -1.16E+00 | -1.16E+00 |
| a6 | -2.72E-01 | -1.96E-01 | 1.10E+00 | 1.45E+00 | 1.76E+00 |
| a8 | 1.51E+00 | -9.88E-02 | -2.49E+00 | -1.15E+00 | -2.25E+00 |
| a10 | -2.96E+00 | 5.00E+00 | 4.49E+00 | 5.93E-01 | 2.24E+00 |
| a12 | 2.99E+00 | -1.32E+01 | -4.62E+00 | -1.91E-01 | -1.69E+00 |
| a14 | -1.14E+00 | 1.56E+01 | 2.61E+00 | 3.83E-02 | 9.32E-01 |
| a16 | 0.00E+00 | -9.28E+00 | -7.72E-01 | -5.44E-03 | -3.66E-01 |
| a18 | 0.00E+00 | 2.26E+00 | 9.54E-02 | 7.36E-04 | 9.91E-02 |
| a20 | 0.00E+00 | 0.00E+00 | 0.00E+00 | -6.67E-05 | -1.75E-02 |
| a22 | | | | | 1.80E-03 |
| a24 | | | | | -8.18E-05 |
| a26 | | | | | |
| a28 | | | | | |
| a30 | | | | | |

FIG.8

| | | | | f(Focus)=3.31 mm,HFOV(Half angular field of view)=34.70 deg. | | |
|---|---|---|---|---|---|---|
| Surface# | | Radius | Thickness | Refractive index | Abbe number | Focus |
| - | Object | ∞ | 600 | | | |
| 300 | 1st lens element | 1.15070 | 0.41022 | 1.54593 | 56.11379 | 2.19010 |
| 310 | | 26.76556 | 0.02000 | | | |
| d1 | Aperture stop | ∞ | 0.08000 | | | |
| 320 | 2nd lens element | 9.34409 | 0.25285 | 1.64023 | 23.90087 | -3.56640 |
| d2 | | 1.81554 | 0.30324 | | | |
| 330 | 3rd lens element | 12.86634 | 0.27452 | 1.64023 | 23.90087 | 68.42320 |
| d3 | | 18.06502 | 0.26386 | | | |
| 340 | 4th lens element | -1.87605 | 0.52753 | 1.53635 | 56.27272 | 4.02730 |
| d4 | | -1.10260 | 0.14032 | | | |
| 350 | 5th lens element | 1.25345 | 0.31689 | 1.53635 | 56.27272 | -4.45710 |
| d5 | | 0.74972 | 0.44397 | | | |
| 360 | IR cut filter | ∞ | 0.30000 | 1.51827 | 64.16640 | |
| d6 | | ∞ | 0.56249 | | | |
| 370 | Image plane | ∞ | | | | |

FIG.11

| Aspherical parameters | | | | | |
|---|---|---|---|---|---|
| Surface# | 311 | 312 | 321 | 322 | 331 |
| K | 0.00E+00 | 0.00E+00 | 0.00E+00 | 0.00E+00 | 0.00E+00 |
| a4 | 8.10E-03 | -1.07E-01 | -2.29E-01 | -1.76E-01 | -3.56E-01 |
| a6 | -1.02E-01 | 4.26E-01 | 9.98E-01 | 9.41E-01 | -1.41E-01 |
| a8 | 7.56E-01 | -1.00E+00 | -2.25E+00 | -2.09E+00 | 1.32E+00 |
| a10 | -2.84E+00 | 1.44E+00 | 3.97E+00 | 5.21E+00 | -5.12E+00 |
| a12 | 5.04E+00 | -1.17E+00 | -4.54E+00 | -8.19E+00 | 9.01E+00 |
| a14 | -3.71E+00 | 0.00E+00 | 2.35E+00 | 8.36E+00 | -5.19E+00 |
| a16 | 0.00E+00 | 0.00E+00 | 0.00E+00 | -2.40E+00 | 0.00E+00 |
| a18 | 0.00E+00 | 0.00E+00 | 0.00E+00 | 0.00E+00 | 0.00E+00 |
| a20 | 0.00E+00 | 0.00E+00 | 0.00E+00 | 0.00E+00 | 0.00E+00 |
| Surface# | 332 | 341 | 342 | 351 | 352 |
| K | 0.00E+00 | 0.00E+00 | -1.01E+00 | -9.97E-01 | -9.99E-01 |
| a4 | -2.16E-01 | 1.63E-01 | -2.12E-01 | -1.19E+00 | -1.36E+00 |
| a6 | -3.51E-01 | -1.11E+00 | 6.89E-01 | 1.40E+00 | 2.13E+00 |
| a8 | 1.79E+00 | 2.56E+00 | -1.88E+00 | -8.85E-01 | -2.83E+00 |
| a10 | -3.67E+00 | 3.43E-02 | 4.01E+00 | 1.64E-01 | 2.98E+00 |
| a12 | 3.87E+00 | -7.49E+00 | -4.42E+00 | 1.80E-01 | -2.39E+00 |
| a14 | -1.54E+00 | 1.18E+01 | 2.55E+00 | -1.50E-01 | 1.42E+00 |
| a16 | 0.00E+00 | -8.03E+00 | -7.51E-01 | 5.04E-02 | -6.04E-01 |
| a18 | 0.00E+00 | 2.14E+00 | 9.06E-02 | -8.25E-03 | 1.79E-01 |
| a20 | 0.00E+00 | 0.00E+00 | 0.00E+00 | 5.41E-04 | -3.45E-02 |
| a22 | | | | | 3.89E-03 |
| a24 | | | | | -1.94E-04 |
| a26 | | | | | |
| a28 | | | | | |
| a30 | | | | | |

FIG.12

| f(Focus)=3.39 mm,HFOV(Half angular field of view)=34.03 deg. | | | | | | |
|---|---|---|---|---|---|---|
| Surface# | | Radius | Thickness | Refractive index | Abbe number | Focus |
| - | Object | ∞ | 600 | | | |
| 400 | Aperture stop | ∞ | -0.19500 | | | |
| 410 | 1st lens element | 1.19620 | 0.38980 | 1.54593 | 56.11380 | 2.24987 |
| d1 | | 40.59550 | 0.10000 | | | |
| 420 | 2nd lens element | 74.76680 | 0.45000 | 1.64023 | 23.90087 | -3.55440 |
| d2 | | 2.20320 | 0.28340 | | | |
| 430 | 3rd lens element | 14.13850 | 0.36920 | 1.64023 | 23.90087 | 91.53707 |
| d3 | | 18.44400 | 0.24070 | | | |
| 440 | 4th lens element | -3.99300 | 0.42710 | 1.53635 | 56.27272 | 4.47034 |
| d4 | | -1.55410 | 0.52970 | | | |
| 450 | 5th lens element | 1.80860 | 0.25650 | 1.53635 | 56.27272 | -3.36357 |
| d5 | | 0.85850 | 0.44400 | | | |
| 460 | IR cut filter | ∞ | 0.30000 | 1.51827 | 64.16640 | |
| d6 | | ∞ | 0.12400 | | | |
| 470 | Image plane | ∞ | | | | |

FIG.15

| Aspherical parameters | | | | | |
|---|---|---|---|---|---|
| Surface# | 411 | 412 | 421 | 422 | 431 |
| K | 0.00E+00 | 0.00E+00 | 0.00E+00 | 0.00E+00 | 0.00E+00 |
| a4 | 5.08E-03 | -9.91E-02 | -1.59E-01 | -8.17E-02 | -2.65E-01 |
| a6 | -1.58E-02 | 3.27E-01 | 4.58E-01 | 3.95E-01 | 2.52E-01 |
| a8 | 3.13E-01 | -8.38E-01 | -1.07E+00 | -3.72E-01 | -5.50E-01 |
| a10 | -1.32E+00 | 1.63E+00 | 2.31E+00 | -1.32E-01 | 6.56E-01 |
| a12 | 2.73E+00 | -1.63E+00 | -3.38E+00 | 3.08E+00 | -2.82E-01 |
| a14 | -2.24E+00 | 0.00E+00 | 1.77E+00 | -6.36E+00 | 5.03E-02 |
| a16 | 0.00E+00 | 0.00E+00 | 0.00E+00 | 5.09E+00 | 0.00E+00 |
| a18 | 0.00E+00 | 0.00E+00 | 0.00E+00 | 0.00E+00 | 0.00E+00 |
| a20 | 0.00E+00 | 0.00E+00 | 0.00E+00 | 0.00E+00 | 0.00E+00 |
| Surface# | 432 | 441 | 442 | 451 | 452 |
| K | 0.00E+00 | 0.00E+00 | 0.00E+00 | -1.00E+00 | -1.00E+00 |
| a4 | -2.25E-01 | -2.18E-01 | -1.55E-01 | -1.06E+00 | -1.16E+00 |
| a6 | 1.91E-01 | 8.85E-02 | 3.88E-01 | 1.26E+00 | 1.76E+00 |
| a8 | 1.28E-01 | 2.44E-01 | -8.93E-01 | -9.05E-01 | -2.15E+00 |
| a10 | -6.16E-01 | 1.14E+00 | 2.20E+00 | 4.15E-01 | 2.01E+00 |
| a12 | 6.72E-01 | -3.80E+00 | -2.71E+00 | -1.20E-01 | -1.39E+00 |
| a14 | -2.35E-01 | 4.34E+00 | 1.72E+00 | 2.17E-02 | 6.92E-01 |
| a16 | 0.00E+00 | -2.31E+00 | -5.54E-01 | -2.49E-03 | -2.44E-01 |
| a18 | 0.00E+00 | 4.83E-01 | 7.27E-02 | 2.12E-04 | 5.90E-02 |
| a20 | 0.00E+00 | 0.00E+00 | 0.00E+00 | -1.23E-05 | -9.28E-03 |
| a22 | | | | 0.00E+00 | 8.51E-04 |
| a24 | | | | 0.00E+00 | -3.44E-05 |
| a26 | | | | 0.00E+00 | 0.00E+00 |
| a28 | | | | 0.00E+00 | 0.00E+00 |
| a30 | | | | 0.00E+00 | 0.00E+00 |

FIG.16

| \multicolumn{6}{c}{f(Focus)=3.30 mm, HFOV(Half angular field of view)=34.78 deg.} |
|---|---|---|---|---|---|
| Surface# | | Radius | Thickness | Refractive index | Abbe number | Focus |
| - | Object | ∞ | 600 | | | |
| 500 | Aperture stop | ∞ | -0.19890 | | | |
| 510 | 1st lens element | 1.16220 | 0.38280 | 1.54593 | 56.11380 | 2.15367 |
| d1 | | 89.23620 | 0.10710 | | | |
| 520 | 2nd lens element | 14.11240 | 0.29660 | 1.64023 | 23.90087 | -3.67536 |
| d2 | | 2.00030 | 0.31920 | | | |
| 530 | 3rd lens element | -19.33880 | 0.45000 | 1.64023 | 23.90087 | 9126.32093 |
| d3 | | -19.45000 | 0.18900 | | | |
| 540 | 4th lens element | -2.54970 | 0.43840 | 1.53635 | 56.27272 | 5.12189 |
| d4 | | -1.40180 | 0.40740 | | | |
| 550 | 5th lens element | 1.53180 | 0.36350 | 1.53635 | 56.27272 | -4.09927 |
| d5 | | 0.82800 | 0.44400 | | | |
| 560 | IR cut filter | ∞ | 0.30000 | 1.51827 | 64.16640 | |
| d6 | | ∞ | 0.20780 | | | |
| 570 | Image plane | ∞ | | | | |

FIG.19

| Aspherical parameters | | | | | |
|---|---|---|---|---|---|
| Surface# | 511 | 512 | 521 | 522 | 531 |
| K | 0.00E+00 | 0.00E+00 | 0.00E+00 | 0.00E+00 | 0.00E+00 |
| a4 | 7.64E-03 | -8.23E-02 | -1.64E-01 | -9.06E-02 | -2.18E-01 |
| a6 | -4.10E-02 | 3.63E-01 | 6.16E-01 | 5.02E-01 | -1.60E-01 |
| a8 | 4.10E-01 | -1.25E+00 | -1.50E+00 | -6.24E-01 | 9.85E-01 |
| a10 | -1.90E+00 | 2.55E+00 | 3.27E+00 | 1.10E+00 | -3.65E+00 |
| a12 | 4.04E+00 | -2.56E+00 | -4.50E+00 | -1.59E-01 | 6.09E+00 |
| a14 | -3.70E+00 | 0.00E+00 | 2.48E+00 | -6.67E-01 | -3.38E+00 |
| a16 | 0.00E+00 | 0.00E+00 | 0.00E+00 | 1.39E+00 | 0.00E+00 |
| a18 | 0.00E+00 | 0.00E+00 | 0.00E+00 | 0.00E+00 | 0.00E+00 |
| a20 | 0.00E+00 | 0.00E+00 | 0.00E+00 | 0.00E+00 | 0.00E+00 |
| Surface# | 532 | 541 | 542 | 551 | 552 |
| K | 0.00E+00 | 0.00E+00 | 0.00E+00 | -1.00E+00 | -1.00E+00 |
| a4 | -1.45E-01 | -1.36E-01 | -2.36E-01 | -9.87E-01 | -1.09E+00 |
| a6 | -1.49E-01 | -7.44E-02 | 7.97E-01 | 1.25E+00 | 1.66E+00 |
| a8 | 7.75E-01 | 3.09E-01 | -1.88E+00 | -1.07E+00 | -2.11E+00 |
| a10 | -1.49E+00 | 1.73E+00 | 3.75E+00 | 6.68E-01 | 2.06E+00 |
| a12 | 1.40E+00 | -5.39E+00 | -4.12E+00 | -3.04E-01 | -1.48E+00 |
| a14 | -4.78E-01 | 6.38E+00 | 2.44E+00 | 9.78E-02 | 7.65E-01 |
| a16 | 0.00E+00 | -3.65E+00 | -7.55E-01 | -2.10E-02 | -2.78E-01 |
| a18 | 0.00E+00 | 8.41E-01 | 9.70E-02 | 2.66E-03 | 6.88E-02 |
| a20 | 0.00E+00 | 0.00E+00 | 0.00E+00 | -1.46E-04 | -1.10E-02 |
| a22 | | | 0.00E+00 | -4.28E-07 | 1.02E-03 |
| a24 | | | 0.00E+00 | 0.00E+00 | -4.16E-05 |
| a26 | | | 0.00E+00 | 0.00E+00 | 0.00E+00 |
| a28 | | | 0.00E+00 | 0.00E+00 | 0.00E+00 |
| a30 | | | 0.00E+00 | 0.00E+00 | 0.00E+00 |

FIG.20

| \multicolumn{7}{c}{f(Focus)=3.41 mm, HFOV(Half angular field of view)=33.92 deg.} |
|---|---|---|---|---|---|---|
| Surface# | | Radius | Thickness | Refractive index | Abbe number | Focus |
| - | Object | ∞ | 600 | | | |
| 600 | Aperture stop | ∞ | -0.19130 | | | |
| 610 | 1st lens element | 1.20070 | 0.38780 | 1.54593 | 56.11380 | 2.25214 |
| d1 | | 45.44960 | 0.10000 | | | |
| 620 | 2nd lens element | 39.79700 | 0.36250 | 1.64023 | 23.90087 | -3.93598 |
| d2 | | 2.36140 | 0.28120 | | | |
| 630 | 3rd lens element | -15.13120 | 0.55000 | 1.64023 | 23.90087 | -11.31156 |
| d3 | | 14.08700 | 0.14000 | | | |
| 640 | 4th lens element | -5.48580 | 0.37300 | 1.53635 | 56.27272 | 3.82293 |
| d4 | | -1.52800 | 0.72880 | | | |
| 650 | 5th lens element | 1.57990 | 0.26520 | 1.53635 | 56.27272 | -3.82103 |
| d5 | | 0.83990 | 0.44400 | | | |
| 660 | IR cut filter | ∞ | 0.30000 | 1.51827 | 64.16640 | |
| d6 | | ∞ | 0.10000 | | | |
| 670 | Image plane | ∞ | | | | |

FIG.23

| Aspherical parameters | | | | | |
|---|---|---|---|---|---|
| Surface# | 611 | 612 | 621 | 622 | 631 |
| K | 0.00E+00 | 0.00E+00 | 0.00E+00 | 0.00E+00 | 0.00E+00 |
| a4 | 5.49E-03 | -8.74E-02 | -1.32E-01 | -5.51E-02 | -2.34E-01 |
| a6 | -2.60E-02 | 2.80E-01 | 4.96E-01 | 4.06E-01 | 1.48E-01 |
| a8 | 3.13E-01 | -7.27E-01 | -1.24E+00 | -5.44E-01 | -5.05E-01 |
| a10 | -1.42E+00 | 1.28E+00 | 2.91E+00 | 1.04E+00 | 9.68E-01 |
| a12 | 2.94E+00 | -1.31E+00 | -4.49E+00 | -4.33E-01 | -9.01E-01 |
| a14 | -2.59E+00 | 0.00E+00 | 2.90E+00 | -9.53E-01 | 4.45E-01 |
| a16 | 0.00E+00 | 0.00E+00 | 0.00E+00 | 2.09E+00 | 0.00E+00 |
| a18 | 0.00E+00 | 0.00E+00 | 0.00E+00 | 0.00E+00 | 0.00E+00 |
| a20 | 0.00E+00 | 0.00E+00 | 0.00E+00 | 0.00E+00 | 0.00E+00 |
| Surface# | 632 | 641 | 642 | 651 | 652 |
| K | 0.00E+00 | 0.00E+00 | 0.00E+00 | -1.00E+00 | -1.00E+00 |
| a4 | -2.17E-01 | -1.94E-01 | -6.18E-02 | -7.79E-01 | -9.25E-01 |
| a6 | 2.32E-01 | 1.91E-01 | 2.71E-01 | 8.71E-01 | 1.25E+00 |
| a8 | -2.96E-01 | 2.42E-01 | -4.95E-01 | -6.77E-01 | -1.38E+00 |
| a10 | 2.55E-01 | -4.49E-01 | 1.28E+00 | 3.96E-01 | 1.17E+00 |
| a12 | -6.64E-02 | 2.77E-01 | -1.61E+00 | -1.73E-01 | -7.27E-01 |
| a14 | -6.53E-03 | -7.62E-02 | 1.01E+00 | 5.39E-02 | 3.26E-01 |
| a16 | 0.00E+00 | -1.31E-02 | -3.15E-01 | -1.11E-02 | -1.03E-01 |
| a18 | 0.00E+00 | 1.23E-02 | 4.04E-02 | 1.34E-03 | 2.24E-02 |
| a20 | 0.00E+00 | 0.00E+00 | 0.00E+00 | -7.06E-05 | -3.14E-03 |
| a22 | | | | | 2.57E-04 |
| a24 | | | | | -9.23E-06 |
| a26 | | | | | 0.00E+00 |
| a28 | | | | | 0.00E+00 |
| a30 | | | | | 0.00E+00 |

FIG.24

| f(Focus)=3.41 mm, HFOV(Half angular field of view)=33.92 deg. ||||||
|---|---|---|---|---|---|---|
| Surface# | | Radius | Thickness | Refractive index | Abbe number | Focus |
| - | Object | ∞ | 600 | | | |
| 700 | Aperture stop | ∞ | -0.31147 | | | |
| 710 | 1st lens element | 1.11585 | 0.48257 | 1.54593 | 56.1138 | 2.1707 |
| d1 | | 16.19088 | 0.1 | | | |
| 720 | 2nd lens element | 7.44396 | 0.21999 | 1.64023 | 23.9009 | -3.70439 |
| d2 | | 1.77787 | 0.30322 | | | |
| 730 | 3rd lens element | -12.17605 | 0.26816 | 1.64023 | 23.9009 | -538.48149 |
| d3 | | -12.73033 | 0.25603 | | | |
| 740 | 4th lens element | -2.31373 | 0.51727 | 1.53635 | 56.2727 | 4.13167 |
| d4 | | -1.22026 | 0.1 | | | |
| 750 | 5th lens element | 1.91486 | 0.43394 | 1.53635 | 56.2727 | -3.9883 |
| d5 | | 0.93046 | 0.43256 | | | |
| 760 | IR cut filter | ∞ | 0.3 | 1.51827 | 64.16640 | |
| d6 | | ∞ | 0.49212 | | | |
| 770 | Image plane | ∞ | | | | |

FIG.27

| Aspherical parameters | | | | | |
|---|---|---|---|---|---|
| Surface# | 711 | 712 | 721 | 722 | 731 |
| K | 0.00E+00 | 0.00E+00 | 0.00E+00 | 0.00E+00 | 0.00E+00 |
| a4 | -5.39E-03 | -1.48E-01 | -3.00E-01 | -1.71E-01 | -3.79E-01 |
| a6 | 2.51E-01 | 7.38E-01 | 1.40E+00 | 9.04E-01 | 2.24E-01 |
| a8 | -2.43E+00 | -1.78E+00 | -3.71E+00 | -9.22E-01 | -6.45E-01 |
| a10 | 1.51E+01 | 2.39E+00 | 6.67E+00 | -1.75E+00 | 5.19E+00 |
| a12 | -5.91E+01 | -1.92E+00 | -8.15E+00 | 9.65E+00 | -1.70E+01 |
| a14 | 1.49E+02 | | 4.28E+00 | -1.09E+01 | 2.37E+01 |
| a16 | -2.35E+02 | | | -5.75E+00 | -1.14E+01 |
| a18 | 2.13E+02 | | | 1.89E+01 | -1.17E+00 |
| a20 | -8.58E+01 | | | | |
| Surface# | 732 | 741 | 742 | 751 | 752 |
| K | 0.00E+00 | 0.00E+00 | -1.06E+00 | -1.06E+00 | -1.06E+00 |
| a4 | -2.62E-01 | 9.89E-02 | -3.51E-01 | -3.51E-01 | -3.51E-01 |
| a6 | 2.76E-02 | -8.74E-01 | 1.28E+00 | 1.28E+00 | 1.28E+00 |
| a8 | 4.20E-01 | 2.55E+00 | -3.23E+00 | -3.23E+00 | -3.23E+00 |
| a10 | 1.17E+00 | -3.86E+00 | 5.81E+00 | 5.81E+00 | 5.81E+00 |
| a12 | -5.07E+00 | 7.06E+00 | -5.95E+00 | -5.95E+00 | -5.95E+00 |
| a14 | 6.11E+00 | -1.37E+01 | 3.03E+00 | 3.03E+00 | 3.03E+00 |
| a16 | -2.52E+00 | 1.61E+01 | -2.30E-01 | -2.30E-01 | -2.30E-01 |
| a18 | | -9.68E+00 | -5.55E-01 | -5.55E-01 | -5.55E-01 |
| a20 | | 2.32E+00 | 2.70E-01 | 2.70E-01 | 2.70E-01 |
| a22 | | | -4.12E-02 | -4.12E-02 | -4.12E-02 |

FIG.28

|        | 1st Embodiment | 2nd Embodiment | 3rd Embodiment | 4th Embodiment | 5th Embodiment | 6th Embodiment | 7th Embodiment |
|--------|----------------|----------------|----------------|----------------|----------------|----------------|----------------|
| T2     | 0.31000        | 0.25763        | 0.25285        | 0.45000        | 0.29660        | 0.36250        | 0.21999        |
| T3     | 0.34207        | 0.27660        | 0.27452        | 0.36920        | 0.45000        | 0.55000        | 0.26816        |
| T2/Gaa | 0.28999        | 0.29805        | 0.31316        | 0.39001        | 0.29001        | 0.29000        | 0.28974        |
| T3/Gaa | 0.31999        | 0.32000        | 0.34000        | 0.31998        | 0.44001        | 0.44000        | 0.35319        |

FIG.30

MOBILE DEVICE AND OPTICAL IMAGING LENS THEREOF

CROSS-REFERENCES TO RELATED APPLICATIONS

This application is a continuation of U.S. patent application Ser. No. 13/617,231, filed on Sep. 14, 2012, entitled "Mobile Device and Optical Imaging Lens Thereof," which claims priority from Taiwan Patent Application No. 101111443, filed on Mar. 30, 2012, the disclosures of which are hereby incorporated by reference in their entirety for all purposes.

TECHNICAL FIELD

The present invention relates to a mobile device and an optical imaging lens thereof, and particularly, relates to a mobile device applying an optical imaging lens having five lens elements and an optical imaging lens thereof.

BACKGROUND OF THE INVENTION

The ever-increasing demand for smaller sized mobile devices, such as cell phones, digital cameras, etc. has correspondingly triggered a growing need for smaller sized photography modules contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

US Patent Publication No. 20100253829, US Patent Publication No. 2011013069, US Patent Publication No. 20110249346, US Patent Publication No. 20100254029, U.S. Pat. No. 7,826,151, U.S. Pat. No. 7,864,454, U.S. Pat. No. 7,911,711, U.S. Pat. No. 8,072,695, Taiwan Patent No. M368072, Taiwan Patent No. M369460 and Taiwan Patent No. M369459 all disclosed an optical imaging lens constructed with an optical imaging lens having five lens elements. Those disclosed optical imaging lenses involved use of a shortened length of the optical imaging lens; however, some of lengths of the optical imaging lens remained too long. For example, in the first embodiment of Taiwan Patent No. M368072, the length of the optical imaging lens is around 5.61 mm, which is not beneficial for the smaller design of mobile devices.

How to effectively shorten the lengths of the optical imaging lens is one of the most important topics in the industry to peruse the trend of smaller and smaller mobile devices. Each of the aforesaid patent documents faces the limitation of the size of the mobile device due to the problem of reducing length of the optical imaging lens. Therefore, there is needed to develop optical imaging lens with shorter lengths, while also having good optical characters.

SUMMARY OF THE INVENTION

An object of the present invention is to provide a mobile device and an optical imaging lens thereof. With controlling the convex or concave shape of the surfaces of the lens elements, the central thickness along the optical axis, and the air gap between two lens elements, etc., the lengths of the optical imaging lens is shortened and meanwhile the good optical characters, such as high resolution and the system performance, are sustained.

In an exemplary embodiment, an optical imaging lens comprises, in order from an object side to an image side, a first lens element, a second lens element, a third lens element, a fourth lens element, and a fifth lens element. The first lens element has positive refractive power and comprises a convex object-side curved surface. The second lens element has negative refractive power and comprises a concave image-side curved surface. The third lens element comprises an object-side curved surface and an image-side curved surface, and the object-side curved surface comprises a concave portion in a vicinity of a periphery of said third lens element and the image-side curved surface comprises a convex portion in a vicinity of a periphery of the third lens element. The fourth lens element comprises a convex image-side curved surface and the fifth lens element comprises an object-side curved surface and an image-side curved surface, wherein the object-side curved surface comprises a convex portion in a vicinity of the optical axis and the image-side curved surface comprises a concave portion in a vicinity of the optical axis. Lens as a whole has only the five lens elements with refractive power, wherein a central thickness of the second lens element along the optical axis is T2, a sum of all air gaps from the first lens element to the fifth lens element along the optical axis is Gaa, and they satisfy the relation:

$0.20 < T2 < 0.50$ (mm); and $0.27 < (T2/Gaa) < 0.40$.

In another exemplary embodiment, other central thickness of lens element along the optical axis and/or other ratio of the central thickness of lens element along the optical axis to the sum of all air gaps could be further controlled, and an example among them is controlling the relation of a central thickness of the third lens element along the optical axis, T3, and the sum of all air gaps from the first lens element to the fifth lens element along the optical axis, Gaa, to satisfy the relation:

$0.30 < (T3/Gaa) < 0.45$.

Another example embodiment comprises controlling T3 to further satisfy the relation:

$0.20 < T3 < 0.60$ (mm).

Yet, another example embodiment comprises controlling T2 and Gaa to further satisfy the relation:

$0.21 < T2 < 0.47$ (mm); and $0.28 < (T2/Gaa) < 0.40$.

Yet, another example embodiment comprises controlling T3 and Gaa to further satisfy the relation:

$0.25 < T3 < 0.57$ (mm); and $0.31 < (T3/Gaa) < 0.45$.

Aforesaid exemplary embodiments are not limited and could be selectively incorporated in other embodiments described herein.

Lens elements in example embodiments, such as the aforesaid first lens element, second lens element, third lens element, fourth lens element, and fifth lens element, are preferable made by plastic lens element with injection molding. Therefore, the technical barrier and the cost may be affected by the thickness of lens element. For example, if the central thickness of the second lens element along the optical axis, T2, is less than the lower limit, 0.2 (mm), the center of the second lens element may be too thin and cause melting plastic material to fail to pass the mold, and compared with currently technical level, the difficulty and cost for production in such situations are too high. Therefore, the lower limits of the above ranges of T2 and T3 are determined based on currently technical level. Further, the thicknesses of the first lens element, the second lens element, the third lens element, the fourth lens element, and fifth lens element affect the length of the optical imaging lens. For example, if the central thickness of the second lens element along the optical axis, T2, exceeds the upper limit, 0.5 (mm), the second lens element may be too thick and cause the length of the optical imaging lens to be too long and fail to match the request of smaller optical imaging lens. Therefore, the upper limits of above ranges of T2 and T3 are determined based on the preferable length of the optical imaging lens.

In example embodiments, an aperture stop is provided for adjusting the input of light of the system. For example, the aperture stop is selectively provided but not limited to be positioned at the object side of the first lens element, or positioned between the first lens element and the second lens element.

In some exemplary embodiments, more details about the convex or concave surface structure and/or the refractive power could be incorporated for one specific lens element or broadly for plural lens elements to enhance the control for the system performance and/or resolution. For example, for the second lens element, an object-side curved surface is comprised, but the object-side curved surface need not be limited to a convex portion in a vicinity of a periphery of the second lens element. An example for illustrating the details broadly for plural lens elements comprises the first lens element having positive refractive power and comprising a convex object-side curved surface; the second lens element having negative refractive power and comprising an object-side curved surface and a concave image-side curved surface; the third lens element comprising an object-side curved surface and an image-side curved surface, wherein the object-side curved surface comprises a convex portion in a vicinity of the optical axis and a concave portion in a vicinity of a periphery of the third lens element, and the image-side curved surface comprises a concave portion in a vicinity of the optical axis and a convex portion in a vicinity of a periphery of the third lens element; the fourth lens element having positive refractive power and comprising a concave object-side curved surface and a convex image-side curved surface; and the fifth lens element having negative refractive power and comprising an object-side curved surface and an image-side curved surface, wherein the object-side curved surface comprises a convex portion in a vicinity of the optical axis and a convex portion in a vicinity of a periphery of the fourth lens element, and the image-side curved surface comprises a concave portion in a vicinity of the optical axis and a convex portion in a vicinity of a periphery of the fourth lens element. Another example for illustrating the details broadly for plural lens elements comprises the first lens element having positive refractive power and comprising a convex object-side curved surface and a concave image-side curved surface; the second lens element having negative refractive power and comprising an object-side curved surface and a concave image-side curved surface, wherein the object-side curved surface of the second lens element comprises a convex portion in a vicinity of the optical axis and a convex portion in a vicinity of a periphery of the second lens element; the third lens element comprising an object-side curved surface and an image-side curved surface, wherein the object-side curved surface comprises a concave portion in a vicinity of the optical axis and a concave portion in a vicinity of a periphery of the third lens element, and the image-side curved surface comprises a convex portion in a vicinity of a periphery of the third lens element; the fourth lens element having positive refractive power and comprising a concave object-side curved surface and a convex image-side curved surface; and the fifth lens element having negative refractive power and comprising an object-side curved surface and an image-side curved surface, wherein the object-side curved surface comprises a convex portion in a vicinity of the optical axis and a convex portion in a vicinity of a periphery of the fifth lens element, and the image-side curved surface comprises a concave portion in a vicinity of the optical axis and a convex portion in a vicinity of a periphery of the fifth lens element. Exemplary embodiments for incorporating details broadly for plural lens elements are not limited to the above examples.

Further, exemplary embodiments could provide more details about the structure, the refractive power, and/or the aperture stop position for a specific lens element or broadly for plural lens elements to fit variable requests. For example, based on the aforesaid examples, an example embodiment comprises the first lens element comprising a convex image-side curved surface, wherein the object-side curved surface of the second lens element comprises a concave portion in a vicinity of the optical axis and a concave portion in a vicinity of a periphery of the second lens element, the third lens element having positive refractive power, and an aperture stop provided at the object side of the first lens element. Another example embodiment is provided with the first lens element comprising a convex image-side curved surface, wherein the object-side curved surface of the second lens element comprises a convex portion in a vicinity of the optical axis and a convex portion in a vicinity of a periphery of the second lens element, the third lens element having negative refractive power, and an aperture stop provided at the object side of the first lens element. Another example embodiment is provided with the first lens element comprising a concave image-side curved surface, the object-side curved surface of the second lens element comprising a convex portion in a vicinity of the optical axis and a convex portion in a vicinity of a periphery of the second lens element, the third lens element having positive refractive power, and an aperture stop provided between the first lens element and the second lens element. Another example embodiment is provided with the first lens element comprising a concave image-side curved surface, the object-side curved surface of the second lens element comprises a convex portion in a vicinity of the optical axis and a concave portion in a vicinity of a periphery of the second lens element, the third lens element having positive refractive power, and an aperture stop provided at the object side of the first lens element. Similarly, based on the later of the aforesaid examples, more examples could be obtained with the further details listed below, including an example embodiment is provided with the third lens element having positive refractive power, and the third lens element the image-side curved surface comprising a convex portion in a vicinity of the optical axis. Another example embodiment is provided with the third lens element having negative refractive power, and the image-side curved surface of the third lens element comprising a concave portion in a vicinity of the optical axis. Another example embodiment is provided with the third lens element having negative refractive power, and the image-side curved surface of the third lens element comprising a convex portion in a vicinity of the optical axis. It is noted that the examples above may be incorporated into other embodiments if no inconsistencies arise.

In another exemplary embodiment, a mobile device comprises a housing and an optical imaging lens assembly positioned in the housing. The optical imaging lens assembly comprises a lens barrel, any of aforesaid example embodiments of optical imaging lens, a module housing unit, and an image sensor. The lens comprising five lens elements with refractive power as a whole is positioned in the lens barrel, the module housing unit is for positioning the optical imaging lens, and the image sensor is positioned at the image-side of the optical imaging lens.

In exemplary embodiments, the module housing unit comprises, but is not limited to, an image sensor base and an auto focus module, wherein the image sensor base is for fixing the image sensor, and the auto focus module comprises a lens seat for positioning the optical imaging lens to control the focusing of the optical imaging lens.

Through controlling the ratio of at least one central thickness of lens element along the optical axis to a sum of all air gaps between the five lens elements along the optical axis in a predetermined range, and incorporated with the arrangement of the convex or concave shape of the surfaces of the lens element(s) and/or refraction power, the mobile device and the optical imaging lens thereof in exemplary embodiments achieve good optical characters and effectively shorten the lengths of the optical imaging lens.

BRIEF DESCRIPTION OF THE DRAWINGS

Exemplary embodiments will be more readily understood from the following detailed description when read in conjunction with the appended drawing, in which:

FIG. 3 shows a table of optical data of each lens element of the optical imaging lens according to an example embodiment;

FIG. 4 shows a table of aspherical data of the optical imaging lens according to an example embodiment;

FIG. 7 shows a table of optical data of each lens element of the optical imaging lens according to an example embodiment;

FIG. 8 shows a table of aspherical data of the optical imaging lens according to an example embodiment;

FIG. 11 shows a table of optical data of each lens element of the optical imaging lens according to an example embodiment;

FIG. 12 shows a table of aspherical data of the optical imaging lens according to an example embodiment;

FIG. 15 shows a table of optical data of each lens element of the optical imaging lens according to an example embodiment;

FIG. 16 shows a table of aspherical data of the optical imaging lens according to an example embodiment;

FIG. 19 shows a table of optical data of each lens element of the optical imaging lens according to an example embodiment;

FIG. 20 shows a table of aspherical data of the optical imaging lens according to an example embodiment;

FIG. 23 shows a table of optical data of each lens element of the optical imaging lens according to an example embodiment;

FIG. 24 shows a table of aspherical data of the optical imaging lens according to an example embodiment;

FIG. 27 shows a table of optical data of each lens element of the optical imaging lens according to an example embodiment;

FIG. 28 shows a table of aspherical data of the optical imaging lens according to the seventh embodiment of the present invention;

FIG. 30 shows a comparison table for the values of T2, T3, T2/Gaa and T3/Gaa of example embodiments;

DETAILED DESCRIPTION OF THE INVENTION

Figure 1:
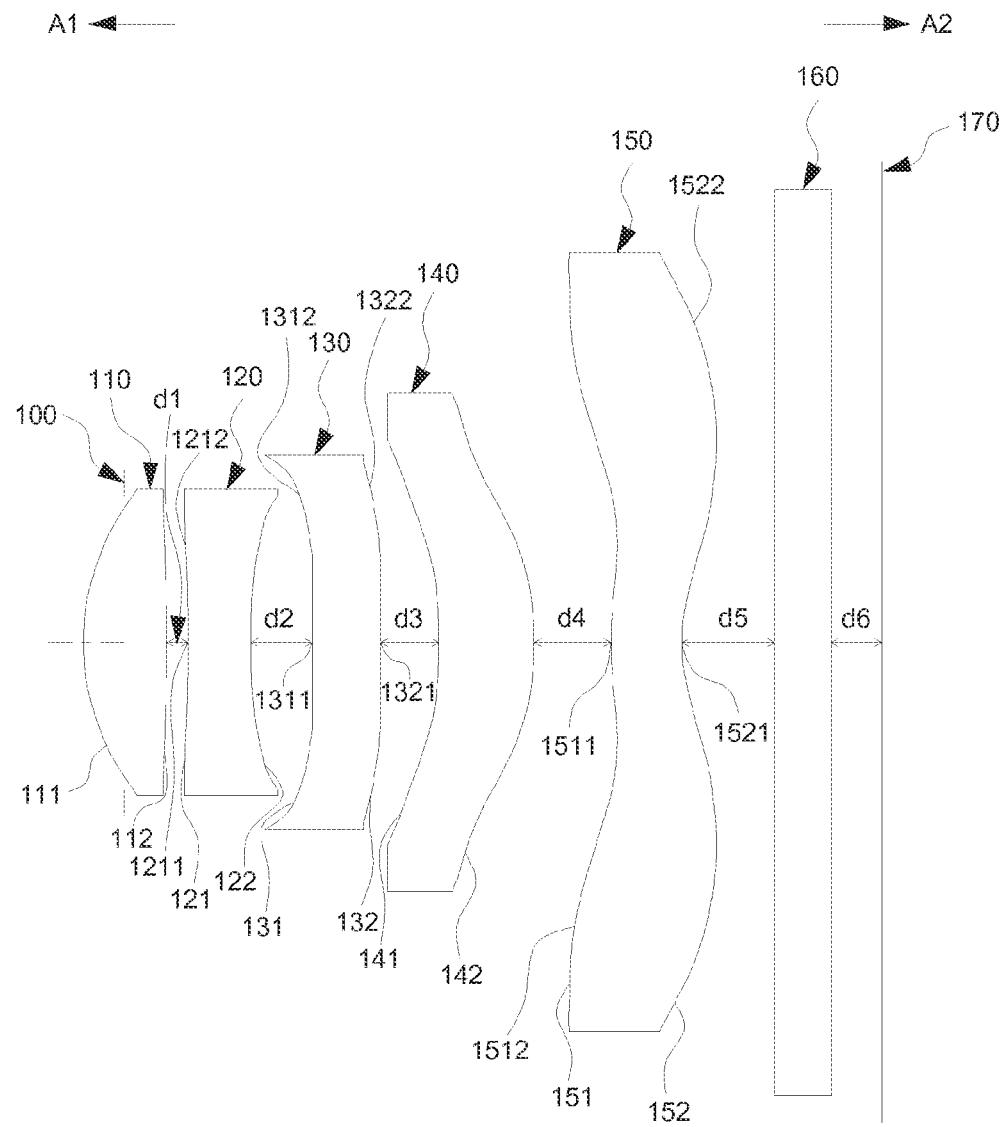
FIG. 1 shows a cross-sectional view of an optical imaging lens having five lens elements of the optical imaging lens according to an example embodiment.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Example embodiments of an optical imaging lens may comprise a first lens element, a second lens element, a third lens element, a fourth lens element, and a fifth lens element. These lens elements may be arranged in an order from an object side to an image side, and example embodiments of the lens as a whole may comprise the five lens elements with refractive power. In an example embodiment: the first lens element having positive refractive power comprises a convex object-side curved surface; the second lens element having negative refractive power comprises a concave image-side curved surface; the third lens element comprises an object-side curved surface and an image-side curved surface, wherein the object-side curved surface comprises a concave portion in a vicinity of a periphery of the third lens element and the image-side curved surface comprises a convex portion in a vicinity of a periphery of the third lens element; the fourth lens element comprises a convex image-side curved surface; the fifth lens element comprises an object-side curved surface and an image-side curved surface, wherein the object-side curved surface comprises a convex portion in a vicinity of the optical axis, the image-side curved surface comprises a concave portion in a vicinity of the optical axis. The central thickness of the second lens element the along the optical axis, T2, and the sum of all air gaps between the first lens element to the fifth lens element along the optical axis, Gaa, satisfy the relation as followed:

$$0.20 < T2 < 0.50 \text{ (mm)} \quad \text{equation (1); and}$$

$$0.27 < (T2/Gaa) < 0.40 \quad \text{equation (2);}$$

and/or $$0.21 < T2 < 0.47 \text{ (mm)} \quad \text{equation (1'); and}$$

$$0.28 < (T2/Gaa) < 0.40 \quad \text{equation (2');}$$

to achieve good optical characters and shortened length of the optical imaging lens.

In some example embodiments, other thicknesses of lens along the optical axis and/or the ratio of which to the sum of all air gaps can be also controlled, and an example is provided with controlling a central thickness of the third lens element along the optical axis, T3, and/or controlling the ratio of T3 to Gaa to satisfy the relation:

$$0.20 < T3 < 0.60 \text{ (mm)} \quad \text{equation (3); and/or}$$

$$0.30 < (T3/Gaa) < 0.45 \quad \text{equation (4);}$$

and/or $$0.25 < T3 < 0.57 \text{ (mm)} \quad \text{equation (3'); and/or}$$

$$0.31 < (T3/Gaa) < 0.45 \quad \text{equation (4').}$$

Because example embodiments of the lens elements, such as aforesaid first lens element, second lens element, third lens element, fourth lens element, and fifth lens element, is pref-erable a lens elements made by injection-molding plastic, the thickness of the lens elements will affect the technical barrier and cost. For example, if the central thickness of the second lens element along the optical axis, T2, is less than the lower limit, 0.2 (mm), the center of the second lens element may be too thin and cause melting plastic material fail to pass the mold, and compared with currently technical level, the difficulty and cost for production in such situation are too high. It will be appreciated that the lower limits of above ranges of T2 and T3 are determined based on current technical levels. Further, the thicknesses of the first lens element, the second lens element, the third lens element, the fourth lens element, and fifth lens element affect the length of the optical imaging lens. For example, if the central thickness of the second lens element along the optical axis, T2, exceeds the upper limit, 0.5 (mm), the second lens element will be too thick and cause the length of the optical imaging lens to be too long and fail to match the request of a smaller optical imaging lens. Therefore, the upper limits of the above ranges of T2 and T3 are determined based on the preferable length of the optical imaging lens. When implementing example embodiments, more details about the convex or concave surface structure and/or the refractive power may be incorporated for one specific lens element or broadly for plural lens elements to enhance the control for the system performance and/or resolution, as illustrated in the following embodiments. It is noted that the details listed here could be incorporated in example embodiments if no inconsistency occurs.

Figure 2:
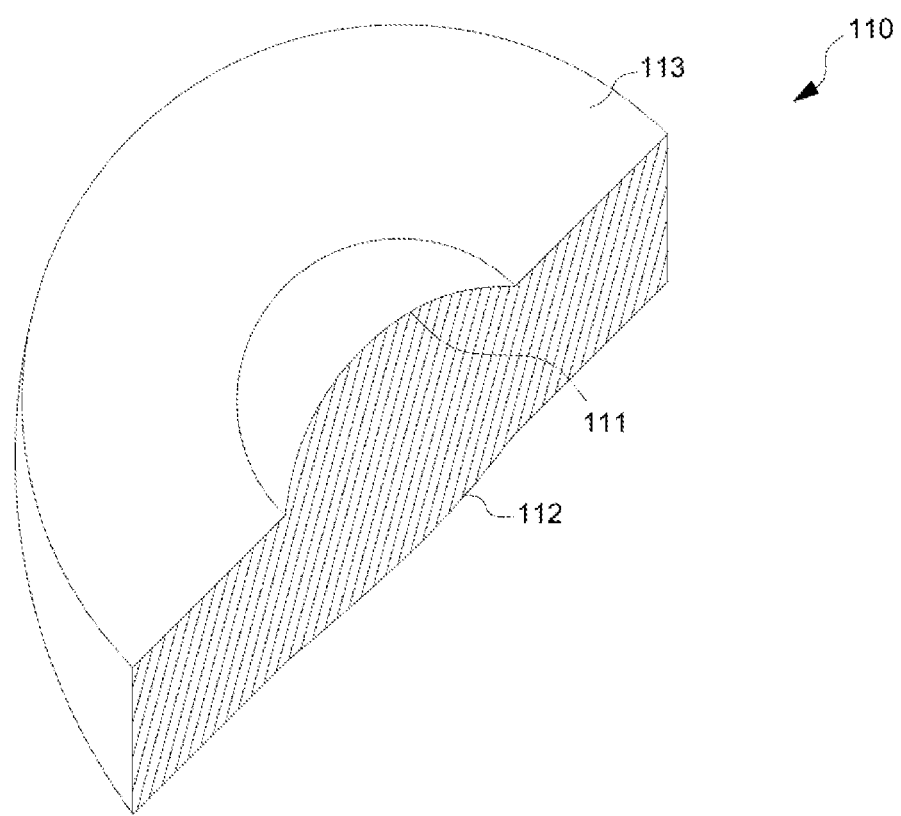
FIG. 2 shows another cross-sectional view of a lens element of the optical imaging lens according to an example embodiment.
Figure 5:
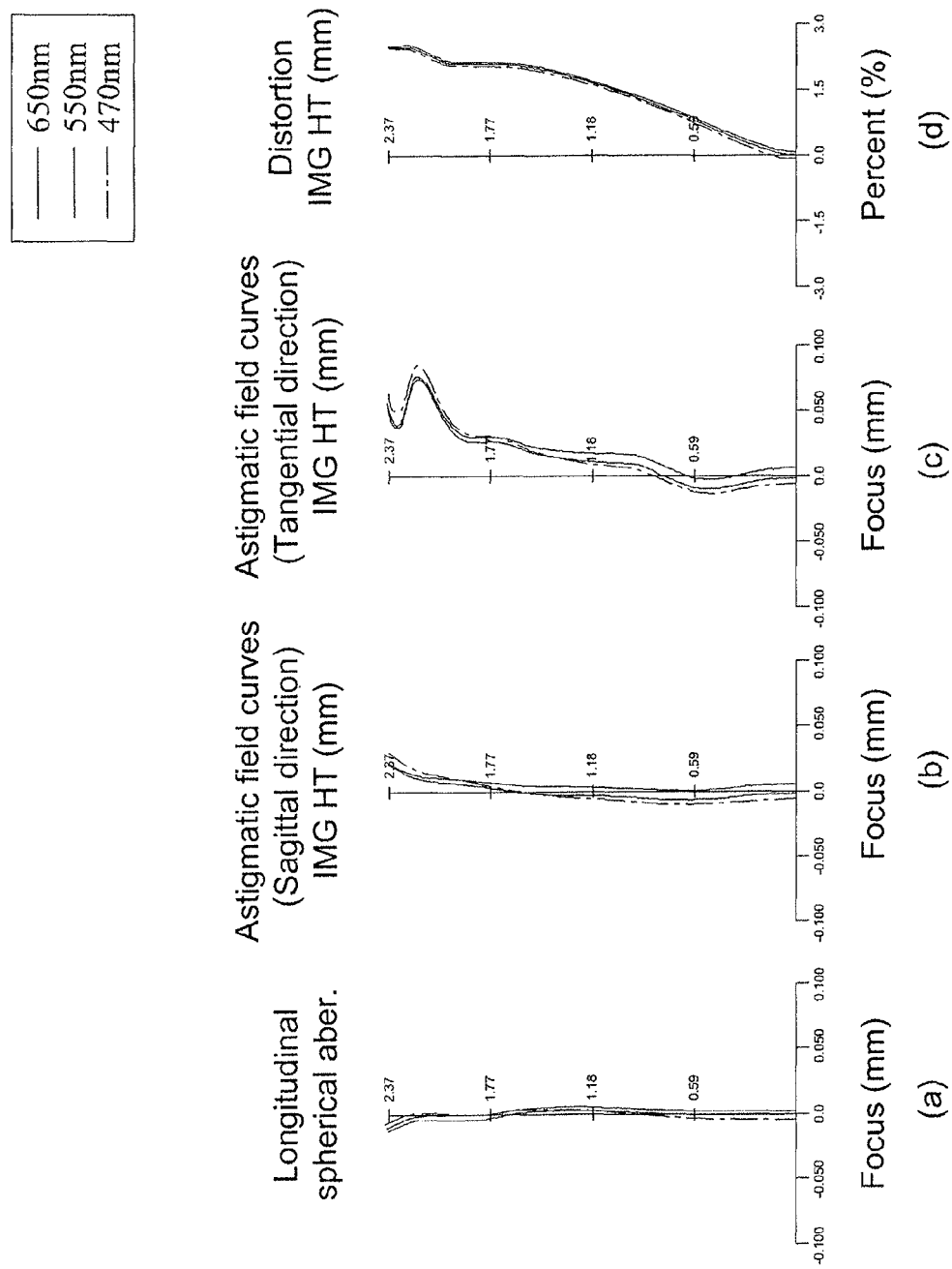
FIG. 5 shows charts of longitudinal spherical aberration and other kinds of optical aberrations of the optical imaging lens according to an example embodiment.

Several exemplary embodiments and associated optical data will now be provided for illustrating example embodiments of optical imaging lens with good optical characters and shortened lengths. Reference is now made to FIGS. 1-5. FIG. 1 illustrates an example cross-sectional view of an optical imaging lens having five lens elements of the optical imaging lens according to a first example embodiment. FIG. 2 illustrates another example cross-sectional view of a lens element of the optical imaging lens according to an example embodiment. FIG. 3 depicts an example table of optical data of each lens element of the optical imaging lens according to an example embodiment. FIG. 4 depicts an example table of aspherical data of the optical imaging lens according to an example embodiment. FIG. 5 shows example charts of longitudinal spherical aberration and other kinds of optical aberrations of the optical imaging lens according to an example embodiment.

As shown in FIG. 1, the optical imaging lens of the present embodiment comprises, in order from an object side A1 to an image side A2, an aperture stop 100 positioned at the object side of a first lens element 110, the first lens element 110, a second lens element 120, a third lens element 130, a fourth lens element 140, and a fifth lens element 150. Both of a filtering unit 160 and image plane 170 of an image sensor are positioned at the image side A2 of the optical imaging lens. The example embodiment of filtering unit 160 illustrated is an IR cut filter (infrared cut filter) positioned between the image-side curved surface 152 of the fifth lens element 150 and an image plane 170, which filters out light with specific wavelength from the light passing optical imaging lens. For example, IR light is filtered out, and this will prohibit the IR light which is not seen by human eyes from producing an image on the image plane 170.

Exemplary embodiments of each lens elements of the optical imaging lens will now be described with reference to the drawings.

An example embodiment of the first lens element 110 may have positive refractive power, which may be constructed by plastic material, and may comprise a convex object-side curved surface 111 and a convex image-side curved surface 112. The convex surface 111 and convex surface 112 may both be aspherical surfaces.

The second lens element 120 may have negative refractive power, which may be constructed by plastic material, and may comprise an object-side curved surface 121 having a concave portion 1211 in a vicinity of the optical axis, a concave portion 1212 neighboring the circumference, and a concave image-side curved surface 122. The curved surface 121 and concave surface 122 may both be aspherical surfaces. in a vicinity of the optical axis in a vicinity of the optical axis in a vicinity of a periphery of the fifth lens element 150.

The third lens element 130 may have positive refractive power, which may be constructed by plastic material, and may comprise an object-side curved surface 131 having a convex portion 1311 in a vicinity of the optical axis, and a concave portion 1312 in a vicinity of a periphery of the third lens element 130, and an image-side curved surface 132. The image-side curved surface 132 may comprise a concave portion 1321 in a vicinity of the optical axis and a convex portion 1322 in a vicinity of a periphery of the third lens element 130. The curved surface 131, 132 may both be aspherical surfaces.

The fourth lens element 140 may have positive refractive power, which may be constructed by plastic material, and may comprise a concave object-side curved surface 141 and a convex image-side curved surface 142. The concave surface 141 and convex surface 142 may both be aspherical surfaces.

The fifth lens element 150 may have negative refractive power, which may be constructed by plastic material, and may comprise an object-side curved surface 151, which may comprise a convex portion 1511 in a vicinity of the optical axis and a convex portion 1512 in a vicinity of a periphery of the fifth lens element 150, and an image-side curved surface 152, which may comprise a concave portion 1521 in a vicinity of the optical axis and a convex portion 1522 in a vicinity of a periphery of the fifth lens element 150. The curved surface 151 and the curved surface 152 may both be gull wing surfaces of aspherical surfaces.

In example embodiments, air gaps exist between the lens elements, the filtering unit 160, and the image plane 170 of the image sensor. For example, FIG. 1 illustrates the air gaps d1 existing between the first lens element 110 and the second lens element 120, the air gaps d2 existing between the second lens element 120 and the third lens element 130, the air gaps d3 existing between the third lens element 130 and the fourth lens element 140, the air gaps d4 existing between the fourth lens element 140 and the fifth lens element 150, the air gaps d5 existing between fifth lens element 150 and the filtering unit 160, and the air gaps d6 existing between the filtering unit 160 and the image plane 170 of the image sensor. However, in other embodiments, any of the aforesaid air gaps may or may not exist. For example, the profiles of opposite surfaces of any two adjacent lens elements may correspond to each other (attached together and therefore form one surface or do not form a surface at all), and in such situation, the air gaps may not exist. The sum of all air gaps d1, d2, d3, d4 between the first and fifth lens elements is denoted by Gaa.

FIG. 3 depicts the optical characters of each lens elements in the optical imaging lens of the present embodiment, wherein the values of T2, T3, T2/Gaa and T3/Gaa are:

$T2$=0.31000 (mm), satisfying equations (1), (1');

$T2/Gaa$=0.28999, satisfying equations (2), (2');

$T3$=0.34207 (mm), satisfying equations (3), (3');

$T3/Gaa$=0.31999, satisfying equations (4), (4');

wherein the distance from the object-side curved surface 111 of the first lens element 110 to the image-side curved surface 152 of the fifth lens element 150 is 3.75436 (mm), and the length of the optical imaging lens is shortened.

Please note that, in example embodiments, to clearly illustrate the structure of each lens element, only the part where light passes, i.e. effective part, is shown. For example, taking the first lens element 110 as an example, FIG. 1 illustrates the convex object-side curved surface 111 and the convex image-side curved surface 112. However, when implementing each lens element of the present embodiment, a non-effective part may be formed selectively. Based on the first lens element 110, please refer to FIG. 2, which illustrates the first lens element 110 comprising a further non-effective part. Here the non-effective part is not limited to a protruding part 113 for mounting the first lens element 110 in the optical imaging lens, and light will not pass through the protruding part 113.

As illustrated in FIG. 1, the aspherical surfaces, including the convex surface 111 and the convex surface 112 of the first lens element 110, the curved surface 121 and the concave surface 122 of the second lens element 120, the curved surfaces 131, 132 of the third lens element 130, the concave surface 141 and the convex surface 142 of the fourth lens element 140, and the curved surface 151 and the curved surface 152 of fifth lens element 150, are all defined by the aspherical formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

wherein:

R represents the radius of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_i$ represents a aspherical coefficient of $i^{th}$ level;

and the values of each aspherical parameter are represented in FIG. 4.

As illustrated in FIG. 5, the optical imaging lens of present example embodiments show great characteristics in the longitudinal spherical aberration (a), astigmatism aberration in the sagittal direction (b), astigmatism aberration in the tangential direction (c), and/or distortion aberration (d). Therefore, according to above illustration, the optical imaging lens of example embodiments indeed achieve great optical performance and the length of the optical imaging lens is effectively shortened.

Figure 6:
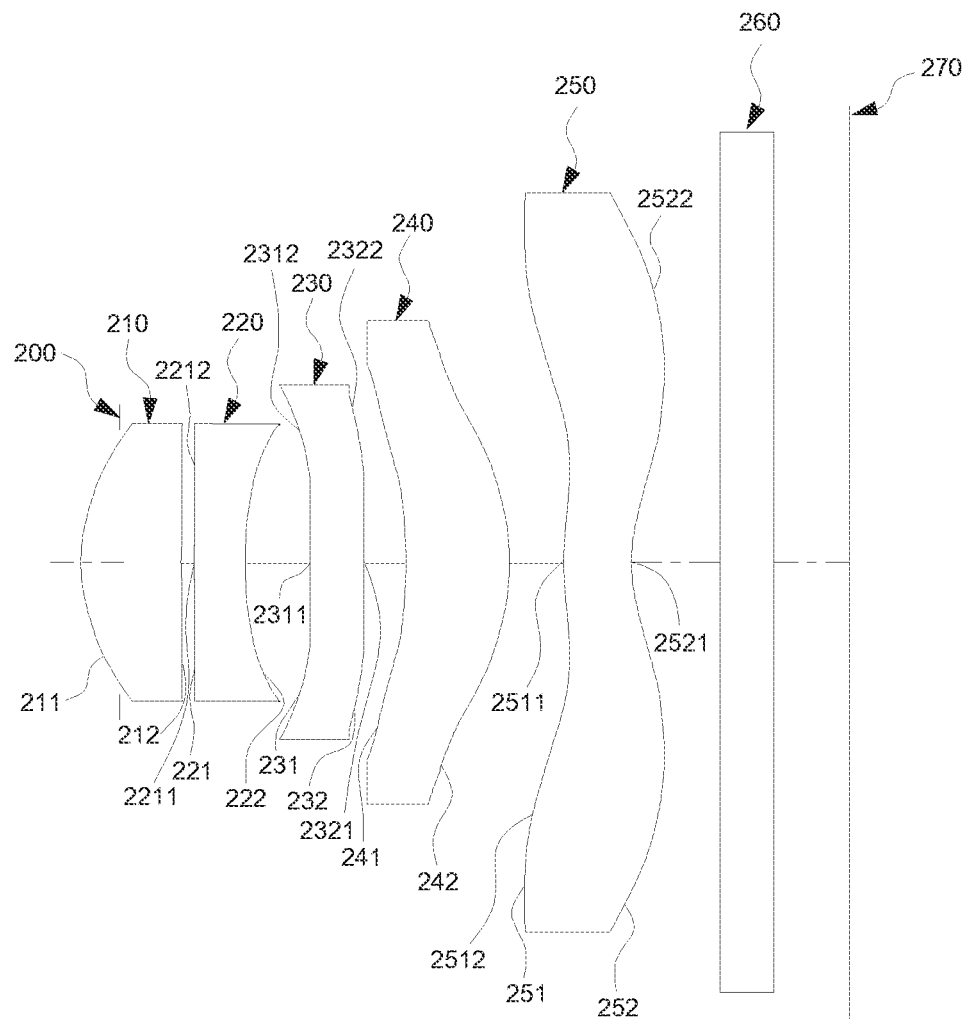
FIG. 6 shows a cross-sectional view of an optical imaging lens having five lens elements of the optical imaging lens according to an example embodiment.
Figure 9:
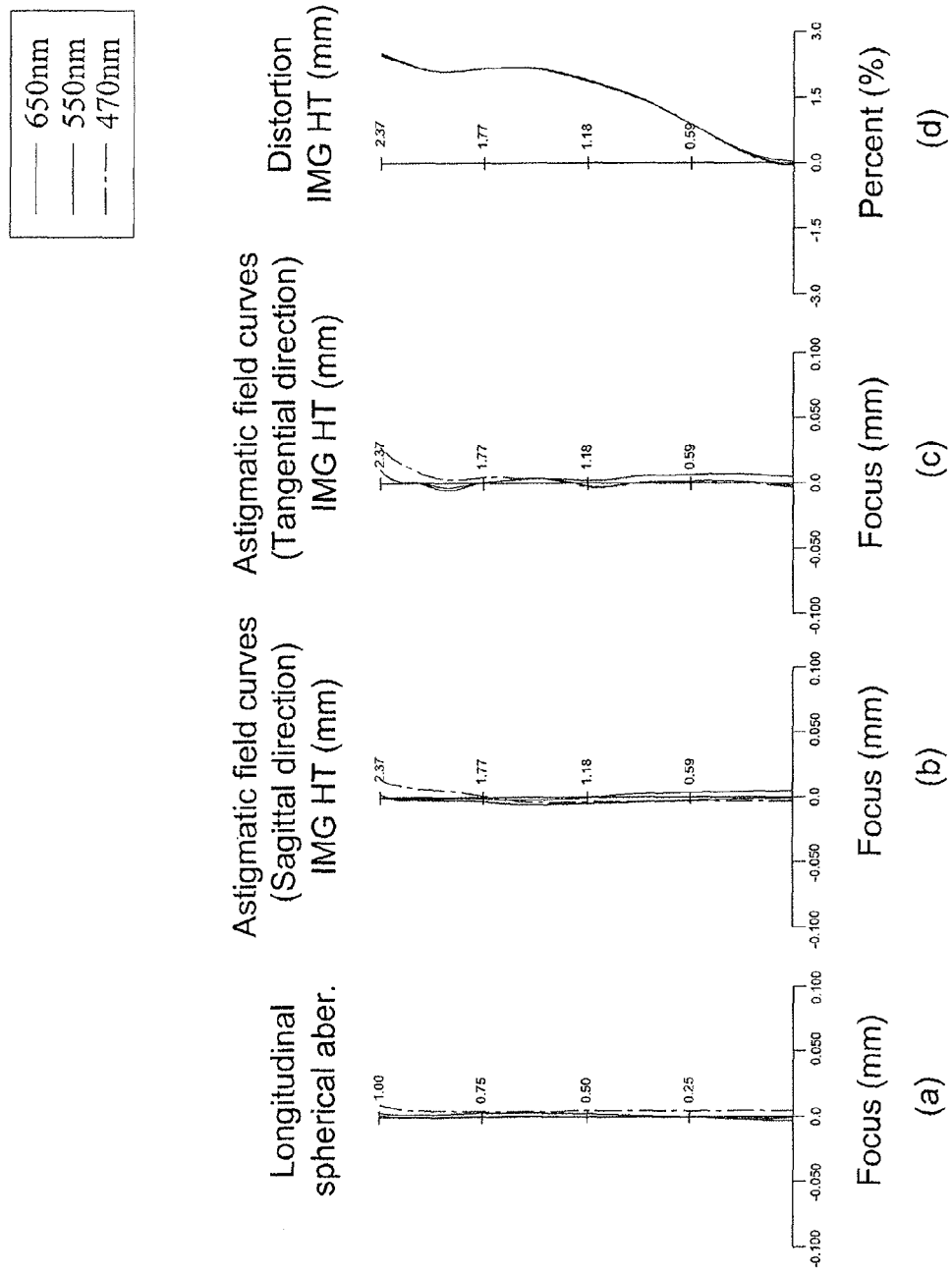
FIG. 9 shows charts of longitudinal spherical aberration and other kinds of optical aberrations of the optical imaging lens according to an example embodiment.

Reference is now made to FIGS. 6-9. FIG. 6 illustrates an example cross-sectional view of an optical imaging lens having five lens elements of the optical imaging lens according to a second example embodiment. FIG. 7 shows an example table of optical data of each lens element of the optical imaging lens according to the second example embodiment. FIG. 8 shows an example table of aspherical data of the optical imaging lens according to the second example embodiment. FIG. 9 shows example charts of longitudinal spherical aberration and other kinds of optical aberrations of the optical imaging lens according to an example embodiment.

As shown in FIG. 6, the optical imaging lens of the present embodiment, in an order from an object side A1 to an image side A2, comprises an aperture stop 200 positioned at the object side of a first lens element 210, the first lens element 210, a second lens element 220, a third lens element 230, a fourth lens element 240, and a fifth lens element 250. Both of a filtering unit 260 and an image plane 270 of an image sensor are positioned at the image side A2 of the optical imaging lens. In an example embodiment, filtering unit 260 is an IR cut filter positioned between the image-side curved surface 252 of the fifth lens element 250 and the image plane 270 to filter out light with specific wavelength from the light passing optical imaging lens. For example, IR light is filtered out, and this will prohibit the IR light which is not seen by human eyes from producing an image on image plane 270.

One difference between the second embodiments and the first embodiments is that the central thickness of lens T2 of the second lens element 220 and the central thickness of lens T3 of the third lens element 230 are different. In this regard, the sum of all air gaps Gaa from the first lens element 210 to the fifth lens element 250 may be different. Please refer to FIG. 7 for the optical characteristics of each lens elements in the optical imaging lens of the present embodiment, wherein the values of T2, T3, T2/Gaa and T3/Gaa are:

$T2$=0.25763 (mm), satisfying equations (1), (1');

$T2/Gaa$=0.29805, satisfying equations (2), (2');

$T3$=0.27660 (mm), satisfying equations (3), (3');

$T3/Gaa$=0.32000, satisfying equations (4), (4')

wherein the distance from the object side of the first lens element to the image side of the fifth lens element is 3.68615 (mm) and the length of the optical imaging lens is shortened.

Example embodiments of the lens elements of the optical imaging lens may comprise the following example embodiments:

The first lens element 210 may have positive refractive power, which may be constructed by plastic material, and may comprise a convex object-side curved surface 211 and a convex image-side curved surface 212. The convex surface 211 and convex surface 212 may both be aspherical surfaces defined by the aspherical formula. Please refer to FIG. 8 for values of the aspherical parameters.

The second lens element 220 may have negative refractive power, which may be constructed by plastic material, and may comprise an object-side curved surface 221, which has a convex portion 2211 in a vicinity of the optical axis and a convex portion 2212 in a vicinity of a periphery of the second lens element 220, and a concave image-side curved surface 222. The curved surface 221 and concave surface 222 may both be aspherical surfaces defined by the aspherical formula. Please refer to FIG. 8 for values of the aspherical parameters.

The third lens element 230 may have negative refractive power, which may be constructed by plastic material, and may comprise an object-side curved surface 231, which has a convex portion 2311 in a vicinity of the optical axis and a concave portion 2312 in a vicinity of a periphery of the third lens element 230, and an image-side curved surface 232, which has a concave portion 2321 in a vicinity of the optical axis and a convex portion 2322 in a vicinity of a periphery of the third lens element 230. The curved surface 231, 232 may both be aspherical surfaces defined by the aspherical formula. Please refer to FIG. 8 for values of the aspherical parameters.

The fourth lens element 240 may have positive refractive power, which may be constructed by plastic material, and may comprise a concave object-side curved surface 241 and a convex image-side curved surface 242. The concave surface 241 and convex surface 242 may both be aspherical surfaces defined by the aspherical formula. Please refer to FIG. 8 for values of the aspherical parameters.

The fifth lens element 250 may have negative refractive power, which may be constructed by plastic material, and may comprise an object-side curved surface 251, which has a convex portion 2511 in a vicinity of the optical axis and a convex portion 2512 in a vicinity of a periphery of the fifth lens element 250, and an image-side curved surface 252, which has a concave portion 2521 in a vicinity of the optical axis and a convex portion 2522 in a vicinity of a periphery of the fifth lens element 250. The curved surface 251, 252 may both be gull wing surfaces of the aspherical surfaces defined by the aspherical formula. Please refer to FIG. 8 for values of the aspherical parameters.

In the present embodiment, similar to the first example embodiment, air gaps may exist between the lens elements 210, 220, 230, 240, 250, the filtering unit 260, and the image plane 270 of the image sensor. Please refer to the positions of the air gaps d1, d2, d3, d4, d5, d6 marked in the first embodiment, wherein the sum of the air gaps d1, d2, d3, d4 is Gaa.

As shown in FIG. 9, the optical imaging lens of the present embodiment shows great characteristics in longitudinal spherical aberration (a), astigmatism in the sagittal direction (b), astigmatism in the tangential direction (c), or distortion aberration (d). Therefore, according to the above illustration, the optical imaging lens of the present embodiment indeed shows great optical performance and the length of the optical imaging lens is effectively shortened.

Figure 10:
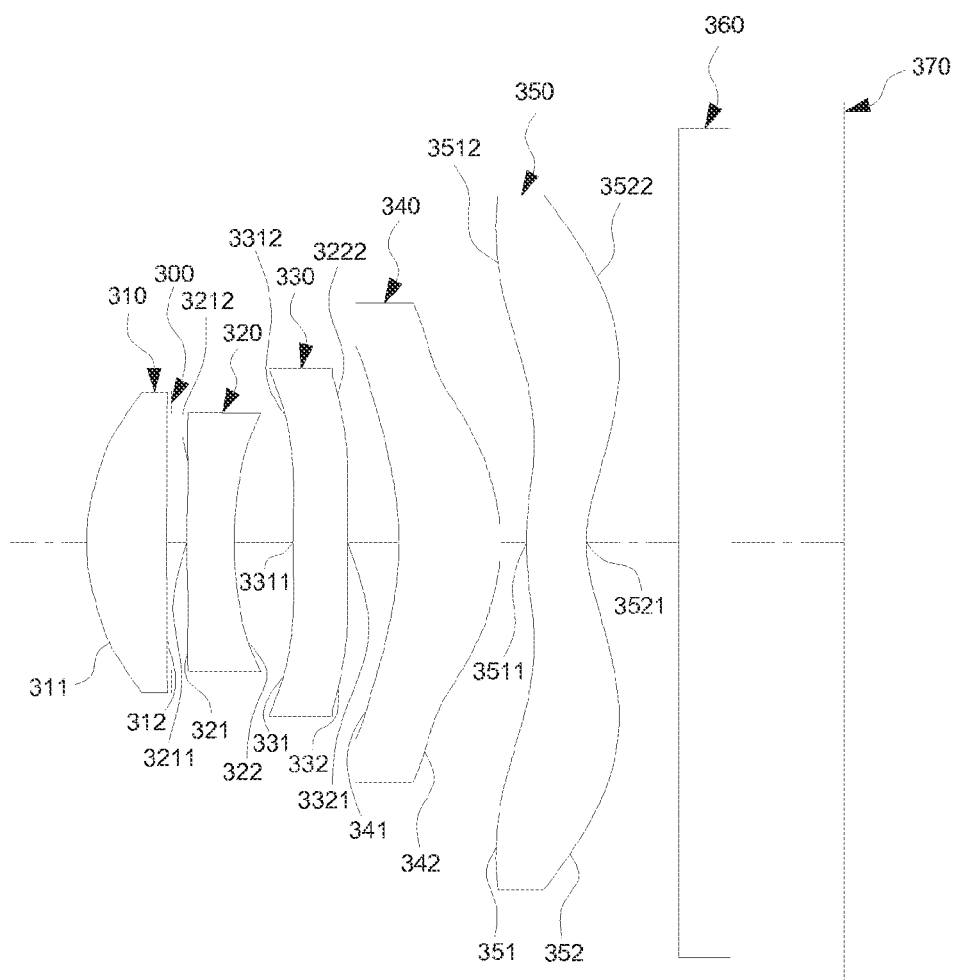
FIG. 10 shows a cross-sectional view of an optical imaging lens having five lens elements of the optical imaging lens according to an example embodiment.
Figure 13:
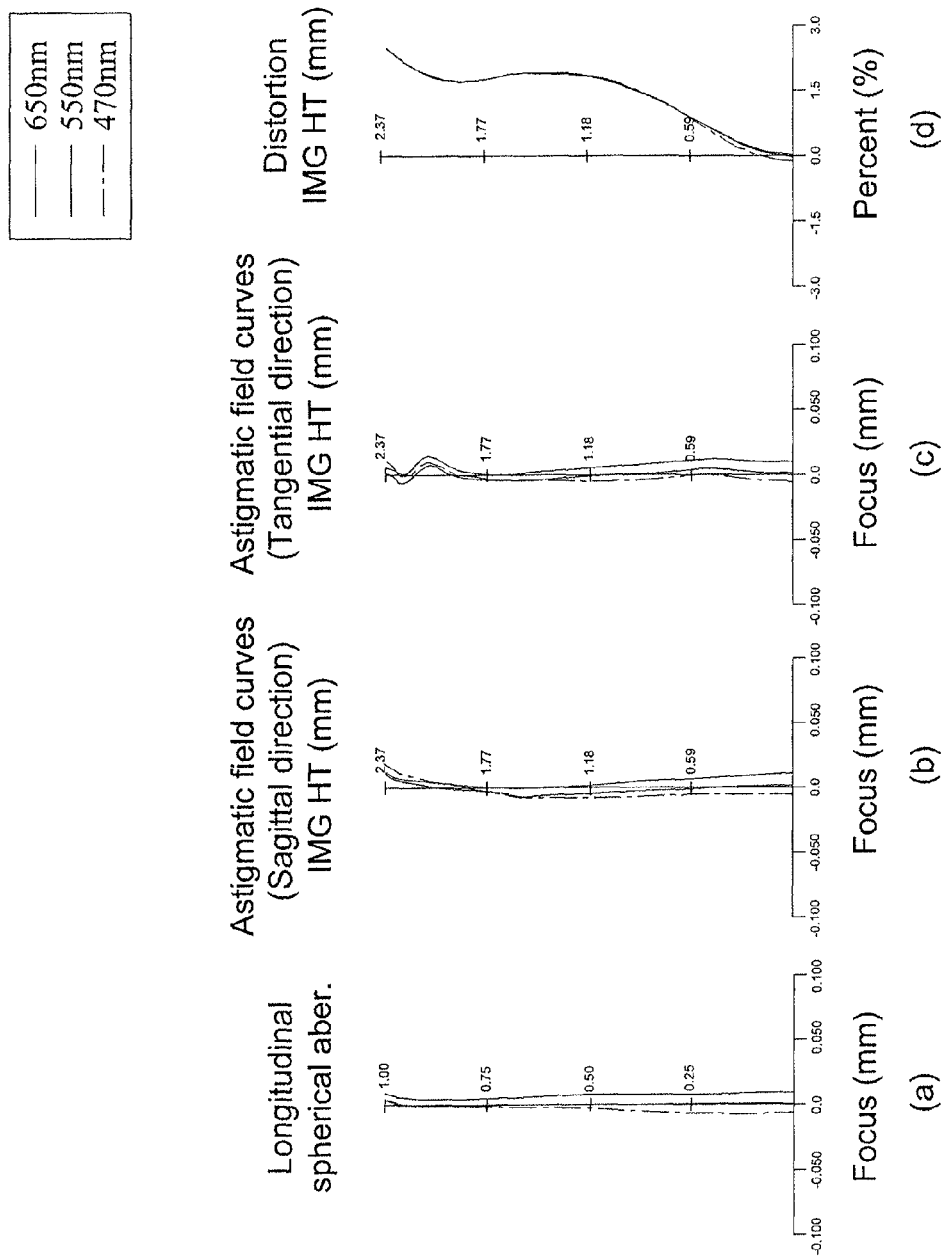
FIG. 13 shows charts of longitudinal spherical aberration and other kinds of optical aberrations of the optical imaging lens according to an example embodiment.

Reference is now made to FIGS. 10-13. FIG. 10 illustrates an example cross-sectional view of an optical imaging lens having five lens elements of the optical imaging lens according to a third example embodiment. FIG. 11 depicts an example table of optical data of each lens element of the optical imaging lens according to the third example embodiment. FIG. 12 depicts an example table of aspherical data of the optical imaging lens according to the third example embodiment. FIG. 13 shows example charts of longitudinal spherical aberration and other kinds of optical aberrations of the optical imaging lens according to the third example embodiment.

As shown in FIG. 10, the optical imaging lens of the present embodiment, in an order from an object side A1 to an image side A2, comprises a first lens element 310, an aperture stop 300 positioned between the first lens element 310 and a second lens element 320, the second lens element 320, a third lens element 330, a fourth lens element 340, and a fifth lens element 350. Both of a filtering unit 360 and an image plane 370 of an image sensor may be positioned at the image side A2 of the optical imaging lens. Here an example embodiment of the filtering unit 360 is an IR cut filter positioned between the image-side curved surface 352 of the fifth lens element 350 and the image plane 370 to filter out light with specific wavelength from the light passing optical imaging lens. For example, the IR light is filtered out, and this will prohibit the IR light which is not seen by human eyes from producing an image on image plane 370.

Please refer to FIG. 11 for the optical characteristics of each lens elements in the optical imaging lens of the present embodiment, wherein the values of T2, T3, T2/Gaa and T3/Gaa are:

$T2$=0.25285 (mm), satisfying equations (1), (1');

$T2/Gaa$=0.31316, satisfying equations (2), (2');

$T3$=0.27452 (mm), satisfying equations (3), (3');

$T3/Gaa$=0.34000, satisfying equations (4), (4');

wherein the distance from the object side of the first lens element 310 to the image side of the fifth lens element 350 is 3.81589 (mm), and the length of the optical imaging lens is shortened.

Example embodiments of the lens elements of the optical imaging lens may comprise the following example embodiments:

The first lens element 310 may have positive refractive power, which may be constructed by plastic material, and may comprise a convex object-side curved surface 311 and a concave image-side curved surface 312. The convex surface 311 and concave surface 312 may both be aspherical surfaces defined by the aspherical formula. Please refer to FIG. 12 for values of the aspherical parameters.

The aperture stop 300 may be positioned between the first lens element 310 and the second lens element 320.

The second lens element 320 may have negative refractive power, which may be constructed by plastic material, and may comprise an object-side curved surface 321, which has a convex portion 3211 in a vicinity of the optical axis and a convex portion 3212 in a vicinity of a periphery of the second lens element 320, and a concave image-side curved surface 322. The curved surface 321 and concave surface 322 may both be aspherical surfaces defined by the aspherical formula. Please refer to FIG. 12 for values of the aspherical parameters.

The third lens element 330 may have positive refractive power, which may be constructed by plastic material, and may comprise an object-side curved surface 331, which has a convex portion 3311 in a vicinity of the optical axis and a concave portion 3312 in a vicinity of a periphery of the third lens element 330, and an image-side curved surface 332, which has a concave portion 3321 in a vicinity of the optical axis and a convex portion 3322 in a vicinity of a periphery of the third lens element 330. The curved surface 331, 332 may both be aspherical surfaces defined by the aspherical formula. Please refer to FIG. 12 for values of the aspherical parameters.

The fourth lens element 340 may have positive refractive power, which may be constructed by plastic material, and may comprise a concave object-side curved surface 341 and a convex image-side curved surface 342. The concave surface 341 and convex surface 342 may both be aspherical surfaces defined by the aspherical formula. Please refer to FIG. 12 for values of the aspherical parameters.

The fifth lens element 350 may have negative refractive power, which may be constructed by plastic material, and may comprise an object-side curved surface 351, which has a convex portion 3511 in a vicinity of the optical axis and a convex portion 3512 in a vicinity of a periphery of the fifth lens element 350, and an image-side curved surface 352, which has a concave portion 3521 in a vicinity of the optical axis and a convex portion 3522 in a vicinity of a periphery of the fifth lens element 350. The curved surface 351, 352 may both be gull wing surfaces of aspherical surfaces defined by the aspherical formula. Please refer to FIG. 12 for values of the aspherical parameters.

In the present embodiment, for comparison, similar to the first embodiment, air gaps may exist between the lens elements 310, 320, 330, 340, 350, the filtering unit 360, and the image plane 370 of the image sensor. Please refer to the positions of the air gaps d1, d2, d3, d4, d5, d6 marked in the first embodiment, wherein the sum of the air gaps d1, d2, d3, d4 is Gaa.

One difference between the third embodiment and the first embodiment is that the central thickness of lens T2 of the second lens element 320 and the central thickness of lens T3 of the third lens element 330 are different. In this regard, the sum of all air gaps Gaa from the first lens element 310 to the fifth lens element 350 may be different. Further, the aperture stop 300 of the present embodiment may be positioned between the first lens element 310 and the second lens element 320, which may be different from the position of the aperture stop 100 in front of the first lens element 110 in the first embodiment.

As illustrated in FIG. 13, it is clear that the optical imaging lens of the present embodiment may achieve great characteristics in longitudinal spherical aberration (a), astigmatism in the sagittal direction (b), astigmatism in the tangential direction (c), or distortion aberration (d). Therefore, according to above illustration, the optical imaging lens of the present embodiment indeed achieve great optical performance, and the length of the optical imaging lens is effectively shortened.

Figure 14:
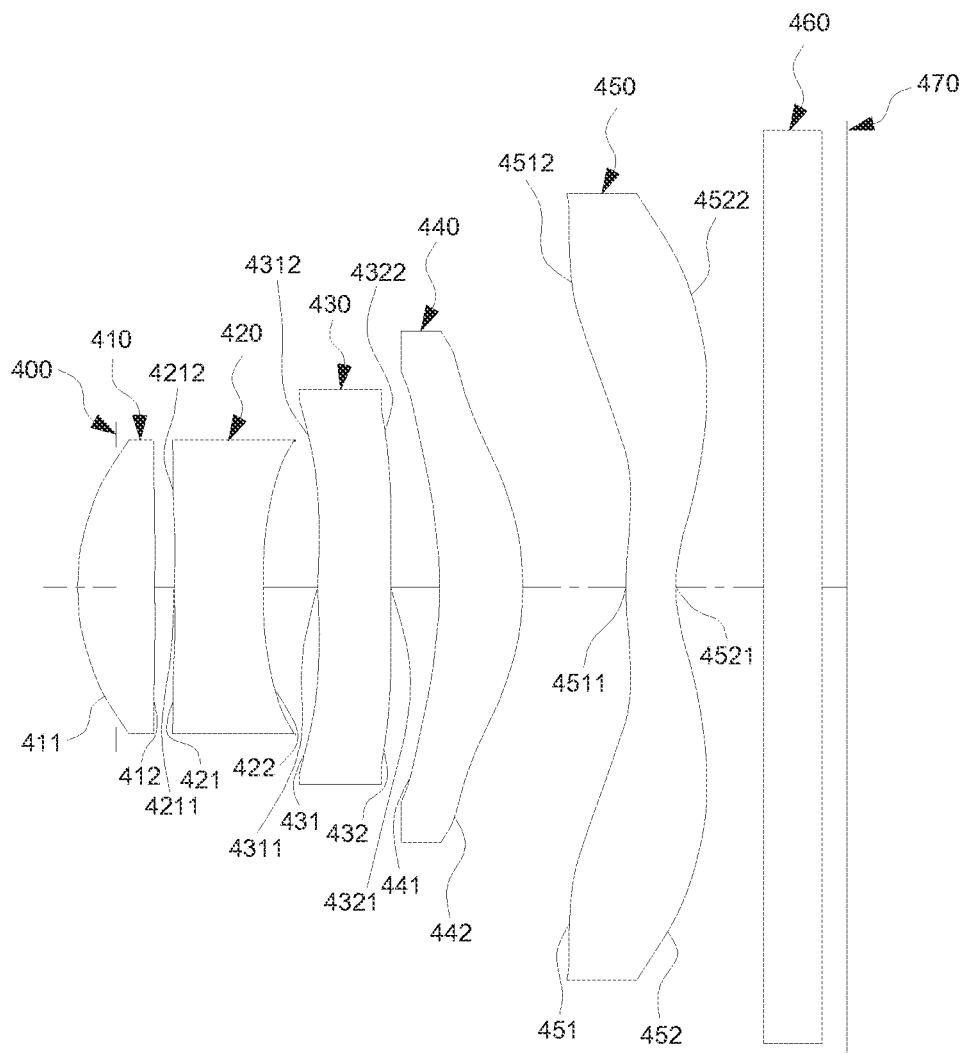
FIG. 14 shows a cross-sectional view of an optical imaging lens having five lens elements of the optical imaging lens according to an example embodiment.
Figure 17:
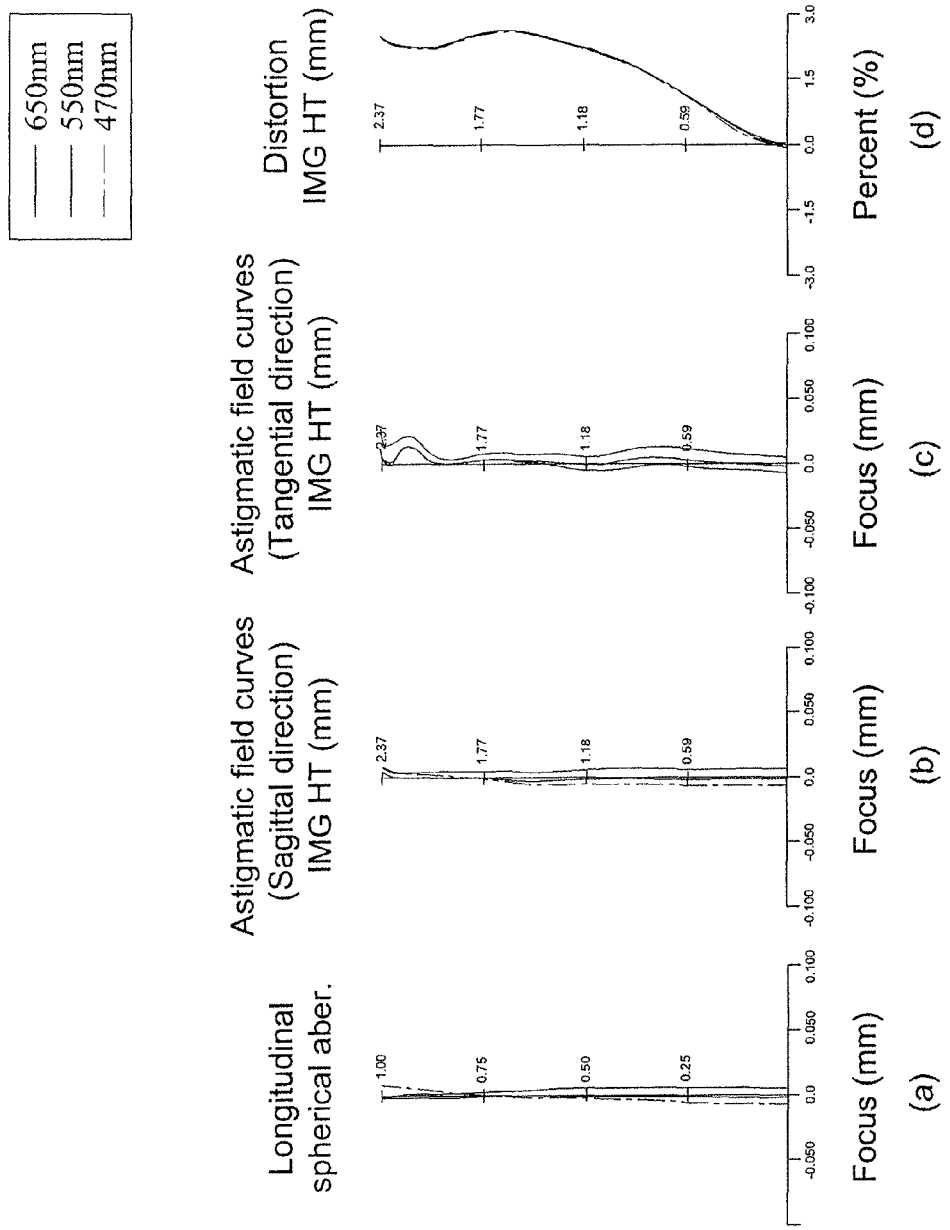
FIG. 17 shows charts of longitudinal spherical aberration and other kinds of optical aberrations of the optical imaging lens according to an example embodiment.

Reference is now made to FIGS. 14-17. FIG. 14 illustrates an example cross-sectional view of an optical imaging lens having five lens elements of the optical imaging lens according to a fourth example embodiment. FIG. 15 shows an example table of optical data of each lens element of the optical imaging lens according to the fourth example embodiment. FIG. 16 shows an example table of aspherical data of the optical imaging lens according to the fourth example embodiment. FIG. 17 shows example charts of longitudinal spherical aberration and other kinds of optical aberrations of the optical imaging lens according to the fourth example embodiment.

As shown in FIG. 14, the optical imaging lens of the present embodiment, in an order from an object side A1 to an image side A2, comprises an aperture stop 400 positioned at the object side of a first lens element 410, the first lens element 410, a second lens element 420, a third lens element 430, a fourth lens element 440, and a fifth lens element 450. Both of a filtering unit 460 and an image plane 470 of an image sensor may be positioned at the image side A2 of the optical imaging lens. Here an example embodiment of filtering unit 460 is an IR cut filter, which may be positioned between the image-side curved surface 452 of the fifth lens element 450 and the image plane 470 to filter out light with specific wavelength from the light passing optical imaging lens. For example, IR light may be filtered out, and this will prohibit the IR light which is not seen by human eyes from producing an image on image plane 470.

Please refer to FIG. 15 for the optical characteristics of each lens elements in the optical imaging lens of the present embodiment, wherein The values of T2, T3, T2/Gaa and T3/Gaa are:

$T2=0.45000$ (mm), satisfying equations (1), (1');

$T2/Gaa=0.39001$, satisfying equations (2), (2');

$T3=0.36920$ (mm), satisfying equations (3), (3');

$T3/Gaa=0.31998$, satisfying equations (4), (4');

wherein the distance from the object side of the first lens element to the image side of the fifth lens element is 3.71940 (mm), and the length of the optical imaging lens is shortened.

Example embodiments of the lens elements of the optical imaging lens may comprise the following example embodiments:

The first lens element 410 may have positive refractive power, which may be constructed by plastic material, and may comprise a convex object-side curved surface 411 and a concave image-side curved surface 412. The convex surface 411 and the concave surface 412 may both be aspherical surfaces defined by the aspherical formula. Please refer to FIG. 16 for values of the aspherical parameters.

The second lens element 420 may have negative refractive power, which may be constructed by plastic material, and may comprise an object-side curved surface 421, which has a convex portion 4211 in a vicinity of the optical axis and a concave portion 4212 in a vicinity of a periphery of the second lens element 420, and a concave image-side curved surface 422. The curved surface 421 and concave surface 422 may both be aspherical surfaces defined by the aspherical formula. Please refer to FIG. 16 for values of the aspherical parameters.

The third lens element 430 may have positive refractive power, which may be constructed by plastic material, and may comprise an object-side curved surface 431, which has a convex portion 4311 in a vicinity of the optical axis and a concave portion 4312 in a vicinity of a periphery of the third lens element 430, and an image-side curved surface 432, which has a concave portion 4321 in a vicinity of the optical axis and a convex portion 4322 in a vicinity of a periphery of the third lens element 430. The curved surface 431, 432 may both be aspherical surfaces defined by the aspherical formula. Please refer to FIG. 16 for values of the aspherical parameters.

The fourth lens element 440 may have positive refractive power, which may be constructed by plastic material, and may comprise a concave object-side curved surface 441 and a convex image-side curved surface 442. The concave surface 441 and convex surface 442 may both be aspherical surfaces defined by the aspherical formula. Please refer to FIG. 16 for values of the aspherical parameters.

The fifth lens element 450 may have negative refractive power, which may be constructed by plastic material, and may comprise an object-side curved surface 451, which has a convex portion 4511 in a vicinity of the optical axis and a convex portion 4512 in a vicinity of a periphery of the fifth lens element 450, and an image-side curved surface 452, which has a concave portion 4521 in a vicinity of the optical axis and a convex portion 4522 in a vicinity of a periphery of the fifth lens element 450. The curved surface 451, 452 may both be gull wing surfaces of aspherical surfaces defined by the aspherical formula. Please refer to FIG. 16 for values of the aspherical parameters.

In the present embodiment, for comparison, similar to the first embodiment, air gaps may exist between the lens elements 410, 420, 430, 440, 450, the filtering unit 460, and the image plane 470 of the image sensor. Please refer to the positions of the air gaps d1, d2, d3, d4, d5, d6 marked in the first embodiment, wherein the sum of the air gaps d1, d2, d3, d4 is Gaa.

One difference between the fourth embodiment and the first embodiment is that the central thickness of lens T2 of the second lens element 420 and the central thickness of lens T3 of the third lens element 430 may be different. In this regard, the sum of all air gaps Gaa from the first lens element 410 to the fifth lens element 450 may be different.

As illustrated in FIG. 17, it is clear that the optical imaging lens of the present embodiment may achieve great characteristics in longitudinal spherical aberration (a), astigmatism in the sagittal direction (b), astigmatism in the tangential direction (c), or distortion aberration (d). Therefore, according to above illustration, the optical imaging lens of the present embodiment indeed achieves great optical performance, and the length of the optical imaging lens is effectively shortened.

Figure 18:
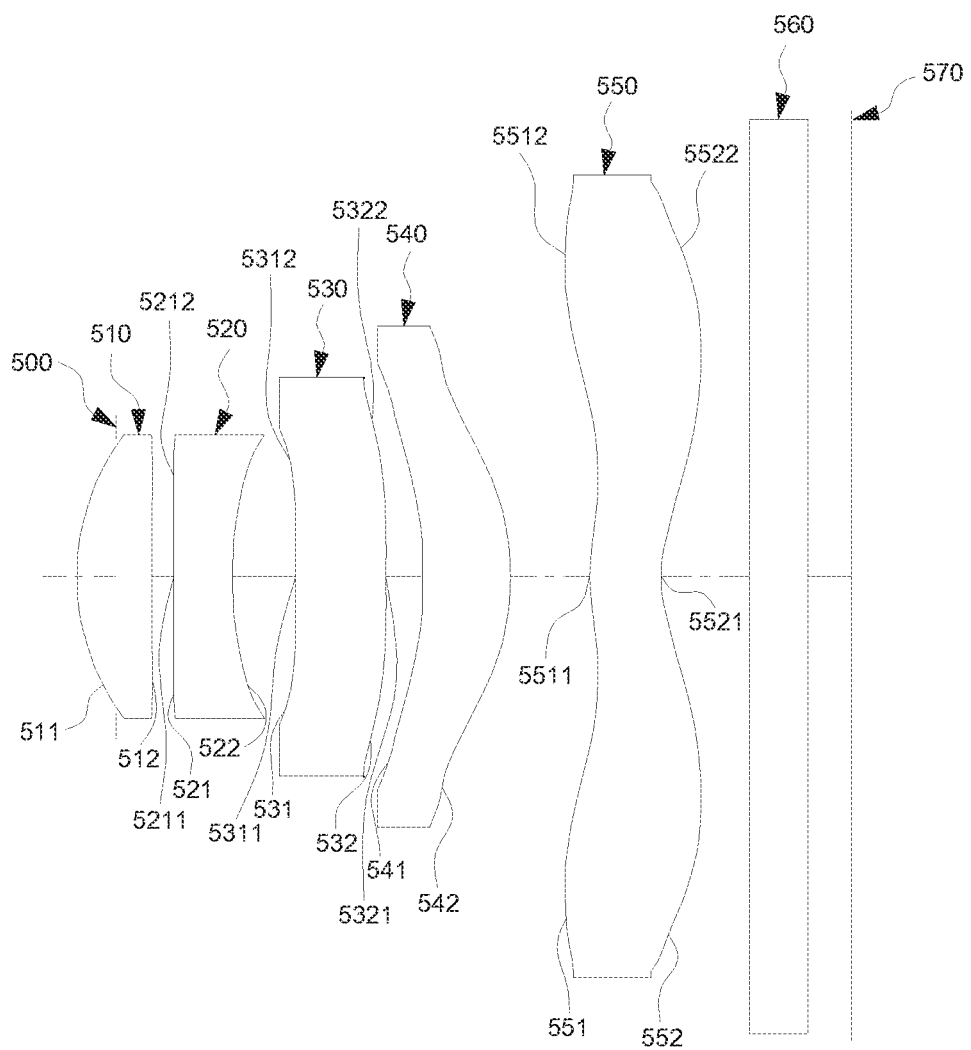
FIG. 18 shows a cross-sectional view of an optical imaging lens having five lens elements of the optical imaging lens according to an example embodiment.
Figure 21:
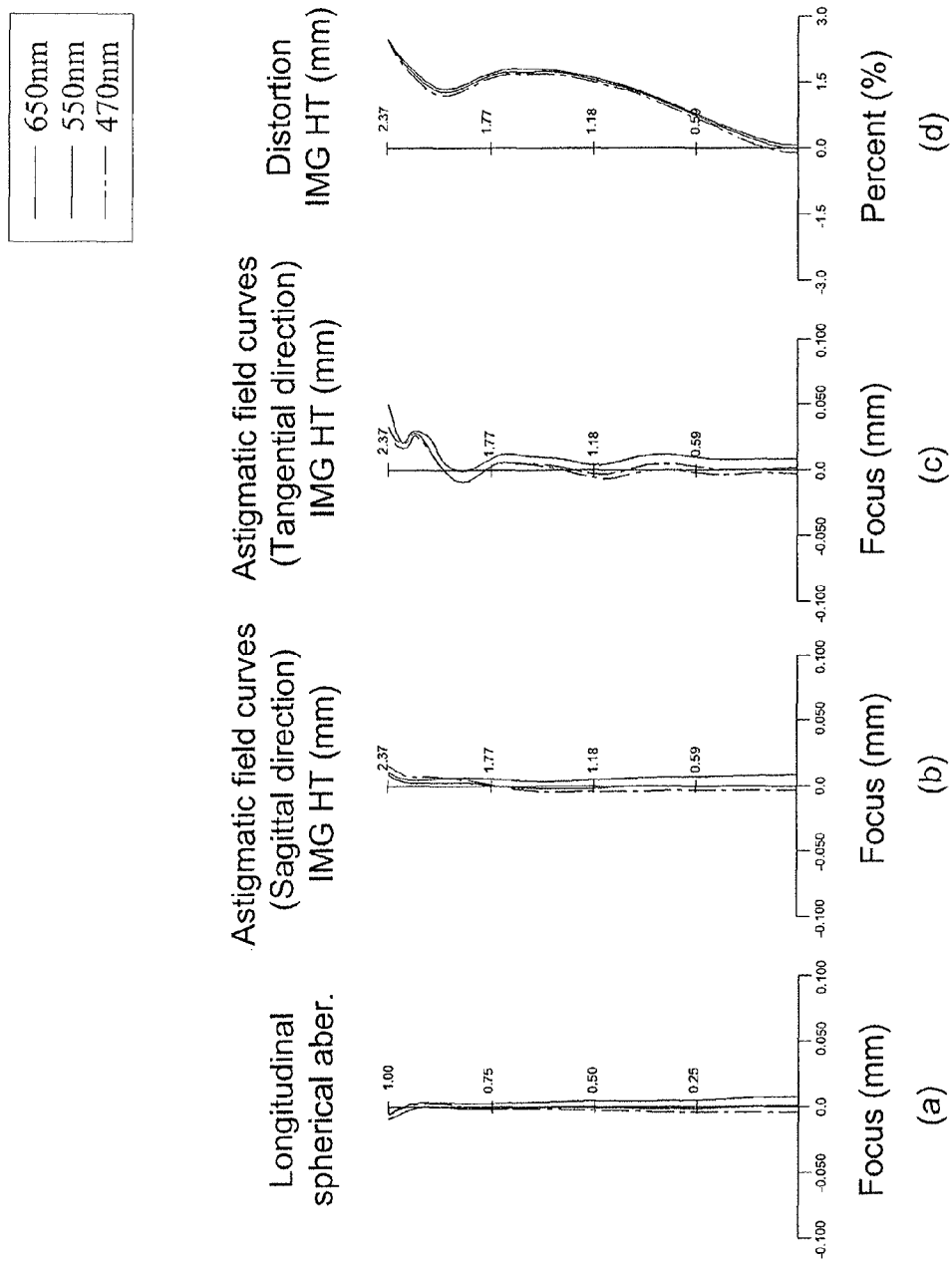
FIG. 21 shows charts of longitudinal spherical aberration and other kinds of optical aberrations of the optical imaging lens according to an example embodiment.

Reference is now made to FIGS. 18-21. FIG. 18 illustrates an example cross-sectional view of an optical imaging lens having five lens elements of the optical imaging lens according to a fifth embodiment. FIG. 19 shows an example table of optical data of each lens element of the optical imaging lens according to the fifth example embodiment. FIG. 20 shows an example table of aspherical data of the optical imaging lens according to the fifth example embodiment. FIG. 21 shows example charts of longitudinal spherical aberration and other kinds of optical aberrations of the optical imaging lens according to the fifth example embodiment.

As shown in FIG. 18, the optical imaging lens of the present embodiment, in an order from an object side A1 to an image side A2, comprises an aperture stop 500 positioned between the object side and a first lens element 510, the first lens element 510, a second lens element 520, a third lens element 530, a fourth lens element 540, and a fifth lens element 550. Both of a filtering unit 560 and an image plane 570 of an image sensor may be positioned at the image side A2 of the optical imaging lens. Here an example embodiment of filtering unit 560 is an IR cut filter, which may be positioned between the image-side curved surface 552 of the fifth lens element 550 and the image plane 570 to filter out light with specific wavelength from the light passing optical imaging lens. For example, IR light may be filtered out, and this will prohibit the IR light which is not seen by human eyes from producing an image on image plane 570.

Please refer to FIG. 19 for the optical characteristics of each lens elements in the optical imaging lens of the present embodiment, wherein The values of T2, T3, T2/Gaa and T3/Gaa are:

$T2=0.29660$ (mm), satisfying equations (1), (1');

$T2/Gaa=0.29001$, satisfying equations (2), (2');

$T3=0.45000$ (mm), satisfying equations (3), (3');

$T3/Gaa=0.44001$, satisfying equations (4), (4');

wherein the distance from the object side of the first lens element to the image side of the fifth lens element is 3.70690 (mm), and the length of the optical imaging lens is shortened.

Example embodiments of the lens elements of the optical imaging lens may comprise the following example embodiments:

The first lens element 510 may have positive refractive power, which may be constructed by plastic material, and may comprise a convex object-side curved surface 511 and a concave image-side curved surface 512. The convex surface 511 and concave surface 512 may both be aspherical surfaces defined by the aspherical formula. Please refer to FIG. 20 for values of the aspherical parameters.

The second lens element 520 may have negative refractive power, which may be constructed by plastic material, and may comprise an object-side curved surface 521, which has a convex portion 5211 in a vicinity of the optical axis and a convex portion 5212 in a vicinity of a periphery of the second lens element 520, and a concave image-side curved surface 522. The curved surface 521 and concave surface 522 may both be aspherical surfaces defined by the aspherical formula. Please refer to FIG. 20 for values of the aspherical parameters.

The third lens element 530 may have positive refractive power, which may be constructed by plastic material, and may comprise an object-side curved surface 531, which has a concave portion 5311 in a vicinity of the optical axis and a concave portion 5312 in a vicinity of a periphery of the third lens element 530, and an image-side curved surface 532, which has a convex portion 5321 in a vicinity of the optical axis and a convex portion 5322 in a vicinity of a periphery of the third lens element 530. The curved surface 531, 532 may both be aspherical surfaces defined by the aspherical formula. Please refer to FIG. 20 for values of the aspherical parameters.

The fourth lens element 540 may have positive refractive power, which may be constructed by plastic material, and may comprise a concave object-side curved surface 541 and a convex image-side curved surface 542. The concave surface 541 and convex surface 542 may both be aspherical surfaces defined by the aspherical formula. Please refer to FIG. 20 for values of the aspherical parameters.

The fifth lens element 550 may have negative refractive power, which may be constructed by plastic material, and may comprise an object-side curved surface 551, which has a convex portion 5511 in a vicinity of the optical axis and a convex portion 5512 in a vicinity of a periphery of the fifth lens element 550, and an image-side curved surface 552, which has a concave portion 5521 in a vicinity of the optical axis and a convex portion 5522 in a vicinity of a periphery of the fifth lens element 550. The curved surfaces 551, 552 may both be gull wing surfaces of aspherical surfaces defined by the aspherical formula. Please refer to FIG. 20 for values of the aspherical parameters.

In the present embodiment, for comparison, similar to the first embodiment, air gaps may exist between the lens elements 510, 520, 530, 540, 550, the filtering unit 560, and the image plane 570 of the image sensor. Please refer to the positions of the air gaps d1, d2, d3, d4, d5, d6 marked in the first embodiment, wherein the sum of the air gaps d1, d2, d3, d4 is Gaa.

One difference between the fifth embodiment and the first embodiment is that the central thickness of lens T2 of the second lens element 520 and the central thickness of lens T3 of the third lens element 530 may be different. Therefore, the sum of all air gaps Gaa from the first lens element 510 to the fifth lens element 550 may be different.

As illustrated in FIG. 21, it is clear that the optical imaging lens of the present embodiment may show great characteristics in longitudinal spherical aberration (a), astigmatism in the sagittal direction (b), astigmatism in the tangential direction (c), or distortion aberration (d). Therefore, according to above illustration, the optical imaging lens of the present embodiment indeed achieves great optical performance, and the length of the optical imaging lens is effectively shortened.

Figure 22:
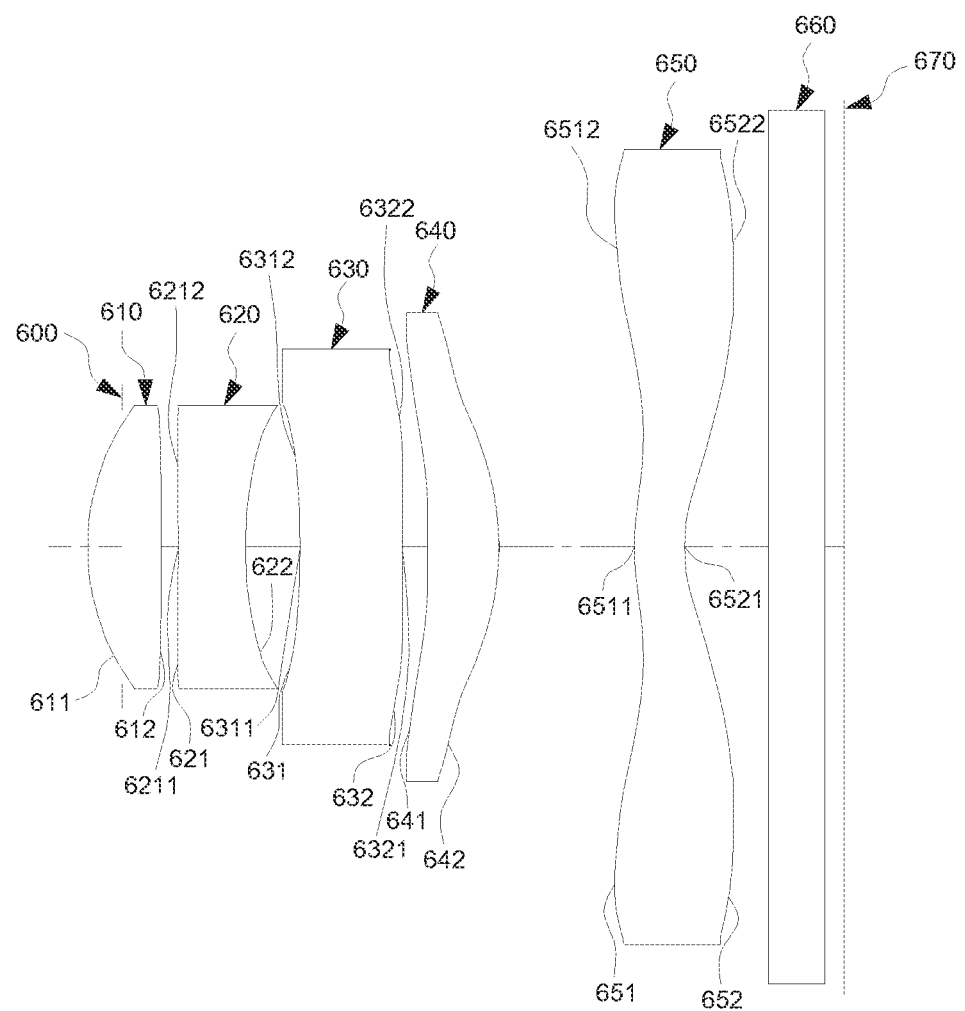
FIG. 22 shows a cross-sectional view of an optical imaging lens having five lens elements of the optical imaging lens according to an example embodiment.
Figure 25:
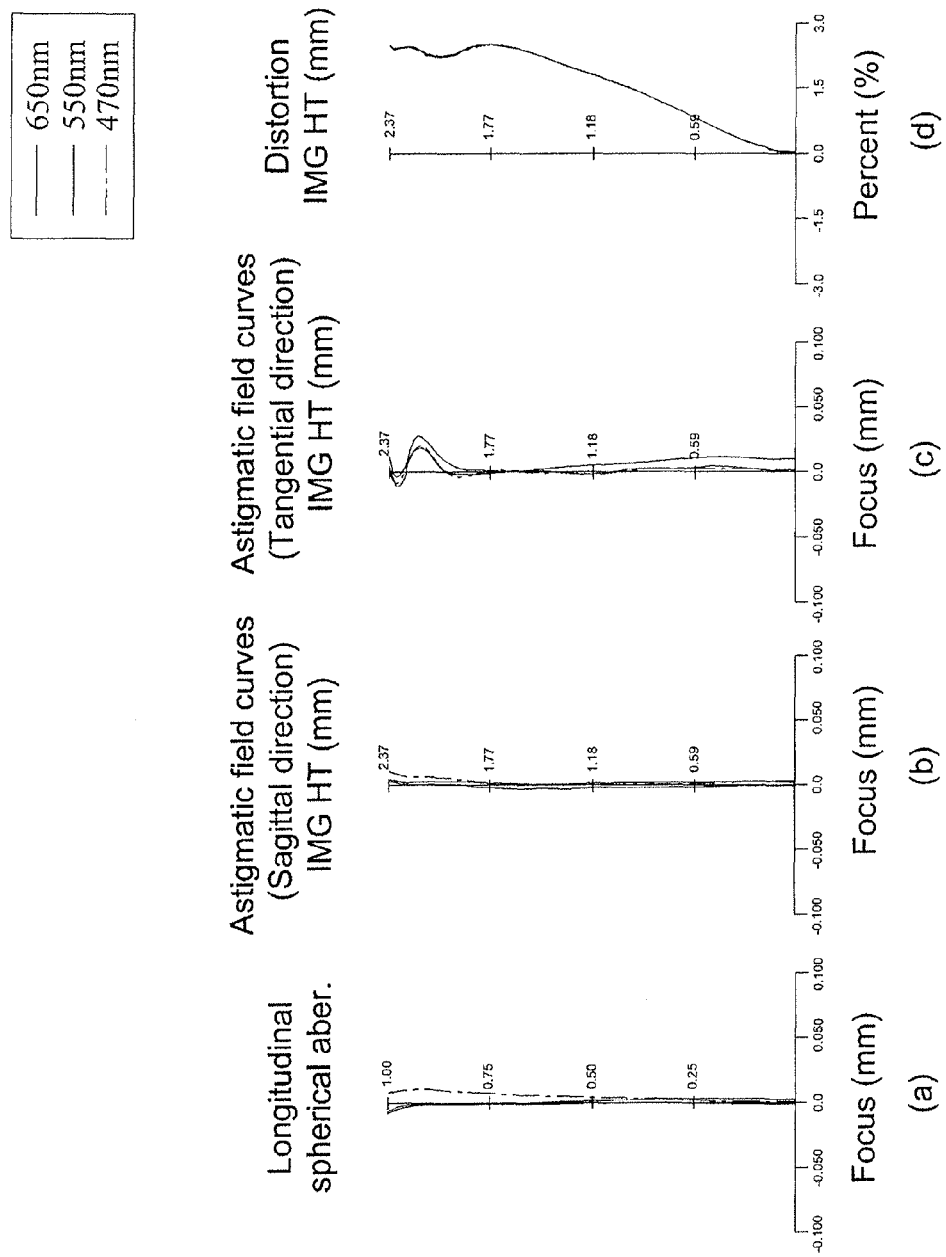
FIG. 25 shows charts of longitudinal spherical aberration and other kinds of optical aberrations of the optical imaging lens according to an example embodiment.

Reference is now made to FIGS. 22-25. FIG. 22 illustrates an example cross-sectional view of an optical imaging lens having five lens elements of the optical imaging lens according to a sixth example embodiment. FIG. 23 shows an example table of optical data of each lens element of the optical imaging lens according to the sixth example embodiment. FIG. 24 shows an example table of aspherical data of the optical imaging lens according to the sixth example embodiment. FIG. 25 shows example charts of longitudinal spherical aberration and other kinds of optical aberrations of the optical imaging lens according to the sixth example embodiment.

As shown in FIG. 22, the optical imaging lens of the present embodiment, in an order from an object side A1 to an image side A2, comprises an aperture stop 600 positioned between the object side and a first lens element 610, the first lens element 610, a second lens element 620, a third lens element 630, a fourth lens element 640, and a fifth lens element 650. Both of a filtering unit 660 and an image plane 670 of an image sensor may be positioned at the image side A2 of the optical imaging lens. Here an example embodiment of filtering unit 660 may be an IR cut filter, which may be positioned between the image-side curved surface 652 of the fifth lens element 650 and the image plane 670 to filter out light with specific wavelength from the light passing optical imaging lens. For example, IR light may be filtered out, and this may prohibit the IR light which is not seen by human eyes from producing an image on image plane 670.

Please refer to FIG. 23 for the optical characteristics of each lens elements in the optical imaging lens of the present embodiment, wherein The values of T2, T3, T2/Gaa and T3/Gaa are:

$T2=0.36250$ (mm), satisfying equations (1), (1');

$T2/Gaa=0.29000$, satisfying equations (2), (2');

$T3=0.55000$ (mm), satisfying equations (3), (3');

$T3/Gaa=0.44000$, satisfying equations (4), (4');

wherein the distance from the object side of the first lens element to the image side of the fifth lens element is 3.84120 (mm), and the length of the optical imaging lens is shortened.

Example embodiments of the lens elements of the optical imaging lens may comprise the following example embodiments:

The first lens element 610 may have positive refractive power, which may be constructed by plastic material, and may comprise a convex object-side curved surface 611 and a concave image-side curved surface 612. The convex surface 611 and 612 may both be aspherical surfaces defined by the aspherical formula. Please refer to FIG. 24 for values of the aspherical parameters.

The second lens element 620 may have negative refractive power, which may be constructed by plastic material, and may be an object-side curved surface 621, which has a convex portion 6211 in a vicinity of the optical axis and a convex portion 6212 in a vicinity of a periphery of the second lens element 620, and a concave image-side curved surface 622. The curved surface 621 and concave surface 622 may both be aspherical surfaces defined by the aspherical formula. Please refer to FIG. 24 for values of the aspherical parameters.

The third lens element 630 may have negative refractive power, which may be constructed by plastic material, and may comprise an object-side curved surface 631, which has a concave portion 6311 in a vicinity of the optical axis and a concave portion 6312 in a vicinity of a periphery of the third lens element 630, and an image-side curved surface 632, which has a concave portion 6321 in a vicinity of the optical axis and a convex portion 6322 in a vicinity of a periphery of the third lens element 630. The curved surface 631, 632 may both be aspherical surfaces defined by the aspherical formula. Please refer to FIG. 24 for values of the aspherical parameters.

The fourth lens element 640 may have positive refractive power, which may be constructed by plastic material, and may comprise a concave object-side curved surface 641 and a convex image-side curved surface 642. The concave surface 641 and convex surface 642 may both be aspherical surfaces defined by the aspherical formula. Please refer to FIG. 24 for values of the aspherical parameters.

The fifth lens element 650 may have negative refractive power, which may be constructed by plastic material, and may comprise an object-side curved surface 651, which has a convex portion 6511 in a vicinity of the optical axis and a convex portion 6512 in a vicinity of a periphery of the fifth lens element 650, and an image-side curved surface 652, which has a concave portion 6521 in a vicinity of the optical axis and a convex portion 6522 in a vicinity of a periphery of the fifth lens element 650. The curved surface 651, 652 may both be gull wing surfaces of aspherical surfaces defined by the aspherical formula. Please refer to FIG. 24 for values of the aspherical parameters.

In the present embodiment, for comparison, similar to the first embodiment, air gaps may exist between the lens elements 610, 620, 630, 640, 650, the filtering unit 660, and the image plane 670 of the image sensor. Please refer to the positions of the air gaps d1, d2, d3, d4, d5, d6 marked in the first embodiment, wherein the sum of the air gaps d1, d2, d3, d4 is Gaa.

One difference between the sixth embodiment and the first embodiment is that the central thickness of lens T2 of the second lens element 620 and the central thickness of lens T3 of the third lens element 630 may be different. In this regard, the sum of all air gaps Gaa from the first lens element 610 to the fifth lens element 650 may be different.

As illustrated in FIG. 25, it is clear that the optical imaging lens of the present embodiment may show great characteristics in longitudinal spherical aberration (a), astigmatism in the sagittal direction (b), astigmatism in the tangential direction (c), or distortion aberration (d). Therefore, according to above illustration, the optical imaging lens of the present embodiment indeed achieves great optical performance, and the length of the optical imaging lens is effectively shortened.

Figure 26:
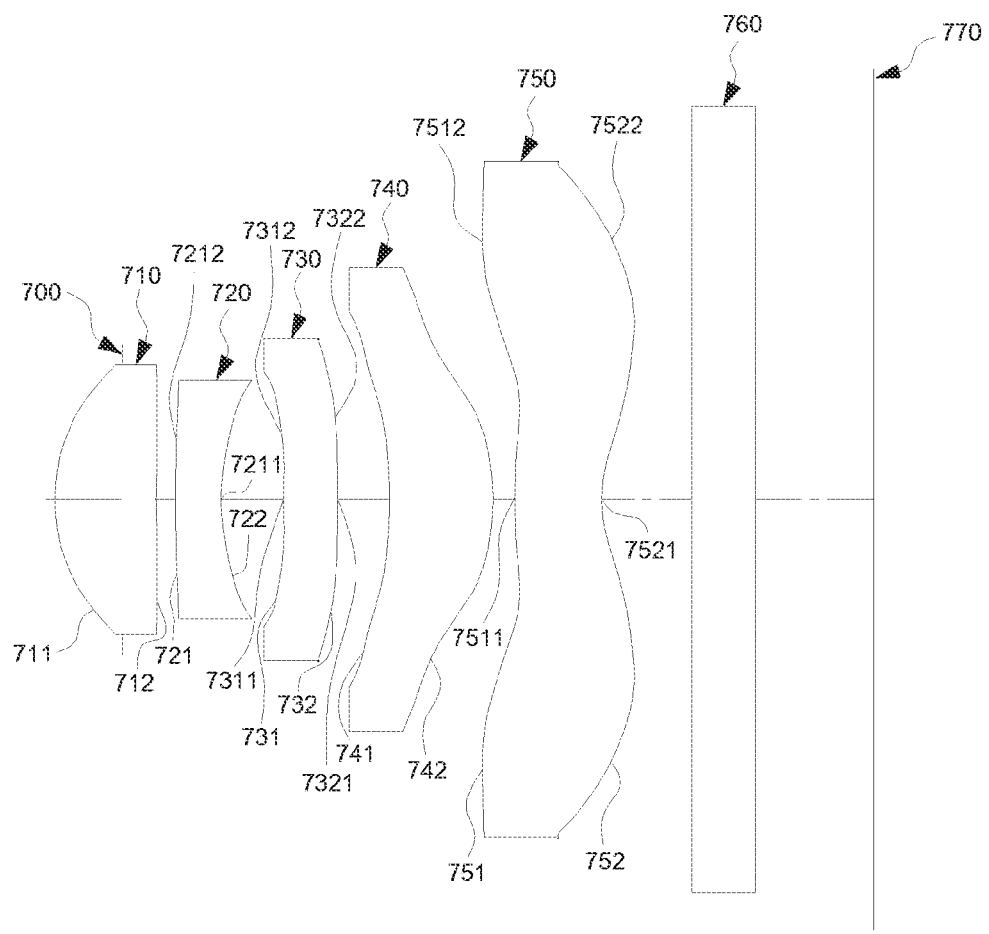
FIG. 26 shows a cross-sectional view of an optical imaging lens having five lens elements of the optical imaging lens according to an example embodiment.
Figure 29:
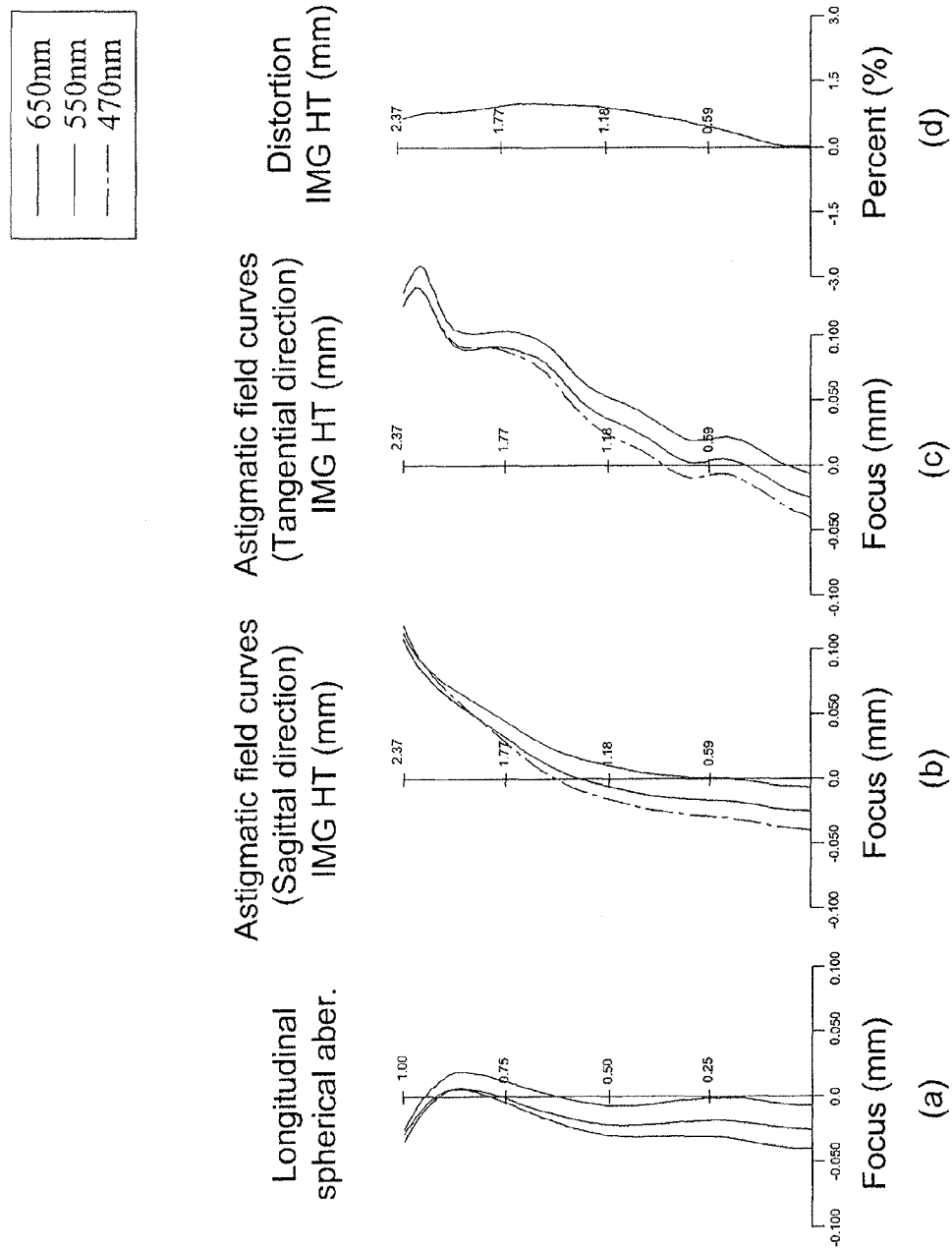
FIG. 29 shows charts of longitudinal spherical aberration and other kinds of optical aberrations of the optical imaging lens according to an example embodiment.

Reference is now made to FIGS. 26-29. FIG. 26 illustrates an example cross-sectional view of an optical imaging lens having five lens elements of the optical imaging lens according to a seventh example embodiment. FIG. 27 shows an example table of optical data of each lens element of the optical imaging lens according to the seventh example embodiment. FIG. 28 shows an example table of aspherical data of the optical imaging lens according to the seventh example embodiment. FIG. 29 shows example charts of longitudinal spherical aberration and other kinds of optical aberrations of the optical imaging lens according to the seventh example embodiment.

As shown in FIG. 26, the optical imaging lens of the present embodiment, in an order from an object side A1 to an image side A2, comprises an aperture stop 700 positioned between the object side and a first lens element 710, the first lens element 710, a second lens element 720, a third lens element 730, a fourth lens element 740, and a fifth lens element 750. Both of a filtering unit 760 and an image plane 770 of an image sensor may be positioned at the image side A2 of the optical imaging lens. Here an example embodiment of filtering unit 760 may comprise an IR cut filter, which is positioned between the image-side curved surface 752 of the fifth lens element 750 and the image plane 770 to filter out light with specific wavelength from the light passing optical imaging lens. For example, IR light is filtered out, and this may prohibit the IR light which is not seen by human eyes from producing an image on image plane 770.

Please refer to FIG. 27 for the optical characteristics of each lens elements in the optical imaging lens of the present embodiment, wherein The values of T2, T3, T2/Gaa and T3/Gaa are:

$T2=0.21999$ (mm), satisfying equations (1), (1');

$T2/Gaa=0.28974$, satisfying equations (2), (2');

$T3=0.26816$ (mm), satisfying equations (3), (3');

$T3/Gaa=0.35319$, satisfying equations (4), (4');

wherein the distance from the object side of the first lens element to the image side of the fifth lens element is 3.59439 (mm), and the length of the optical imaging lens is shortened.

Example embodiments of the lens elements of the optical imaging lens may comprise the following example embodiments:

The first lens element 710 may have positive refractive power, which may be constructed by plastic material, and may comprise a convex object-side curved surface 711 and a concave image-side curved surface 712. The surfaces 711 and 712 may both be aspherical surfaces defined by the aspherical formula. Please refer to FIG. 28 for values of the aspherical parameters.

The second lens element 720 may have negative refractive power, which may be constructed by plastic material, and may comprise an object-side curved surface 721, which has a convex portion 7211 in a vicinity of the optical axis and a convex portion 7212 in a vicinity of a periphery of the second lens element 720, and a concave image-side curved surface 722. The curved surface 721 and concave surface 722 may both be aspherical surfaces defined by the aspherical formula. Please refer to FIG. 28 for values of the aspherical parameters.

The third lens element 730 may have negative refractive power, which may be constructed by plastic material, and may comprise an object-side curved surface 731, which has a concave portion 7311 in a vicinity of the optical axis and a concave portion 7312 in a vicinity of a periphery of the third lens element 730, and an image-side curved surface 732, which has a convex portion 7321 in a vicinity of the optical axis and a convex portion 7322 in a vicinity of a periphery of the third lens element 730. The curved surfaces 731, 732 may both be aspherical surfaces defined by the aspherical formula. Please refer to FIG. 28 for values of the aspherical parameters.

The fourth lens element 740 may have positive refractive power, which may be constructed by plastic material, and may comprise a concave object-side curved surface 741 and a convex image-side curved surface 742. The concave surface 741 and convex surface 742 may both be aspherical surfaces defined by the aspherical formula. Please refer to FIG. 28 for values of the aspherical parameters.

The fifth lens element 750 may have negative refractive power, which may be constructed by plastic material, and may comprise an object-side curved surface 751, which has a convex portion 7511 in a vicinity of the optical axis and a convex portion 7512 in a vicinity of a periphery of the fifth lens element 750, and an image-side curved surface 752, which has a concave portion 7521 in a vicinity of the optical axis and a convex portion 7522 in a vicinity of a periphery of the fifth lens element 750. The curved surfaces 751, 752 may both be gull wing surfaces of aspherical surfaces defined by the aspherical formula. Please refer to FIG. 28 for values of the aspherical parameters.

In the present embodiment, for comparison, similar to the first embodiment, air gaps may exist between the lens elements 710, 720, 730, 740, 750, the filtering unit 760, and the image plane 770 of the image sensor. Please refer to the positions of the air gaps d1, d2, d3, d4, d5, d6 marked in the first embodiment, wherein the sum of the air gaps d1, d2, d3, d4 is Gaa.

One difference between the seventh embodiment and the first embodiment is the central thickness of lens T2 of the second lens element 720 and the central thickness of lens T3 of the third lens element 730 may be different. In this regard, the sum of all air gaps Gaa from the first lens element 710 to the fifth lens element 750 may be different.

As illustrated in FIG. 29, it is clear that the optical imaging lens of the present embodiment may show great characteristics in longitudinal spherical aberration (a), astigmatism in the sagittal direction (b), astigmatism in the tangential direction (c), or distortion aberration (d). Therefore, according to above illustration, the optical imaging lens of the present embodiment indeed achieves great optical performance, and the length of the optical imaging lens is effectively shortened.

Please refer to FIG. 30, which shows the values of T2, T3, T2/Gaa and T3/Gaa of all seven embodiments. As shown, this table provides a clear illustration that the optical imaging lens of example embodiments indeed satisfies the equations (1), (2), (3), (4), (1'), (2'), (3'), and (4').

Figure 31:
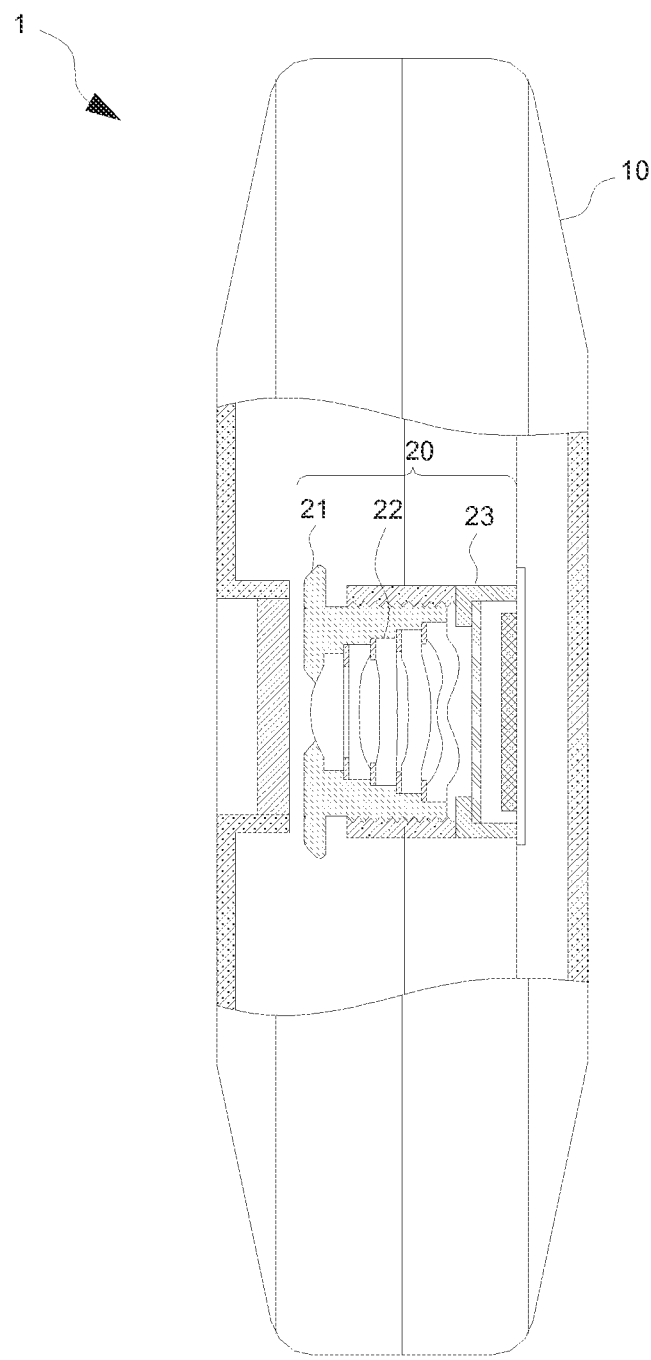
FIG. 31 shows a structure of an example embodiment of a mobile device.
Figure 32:
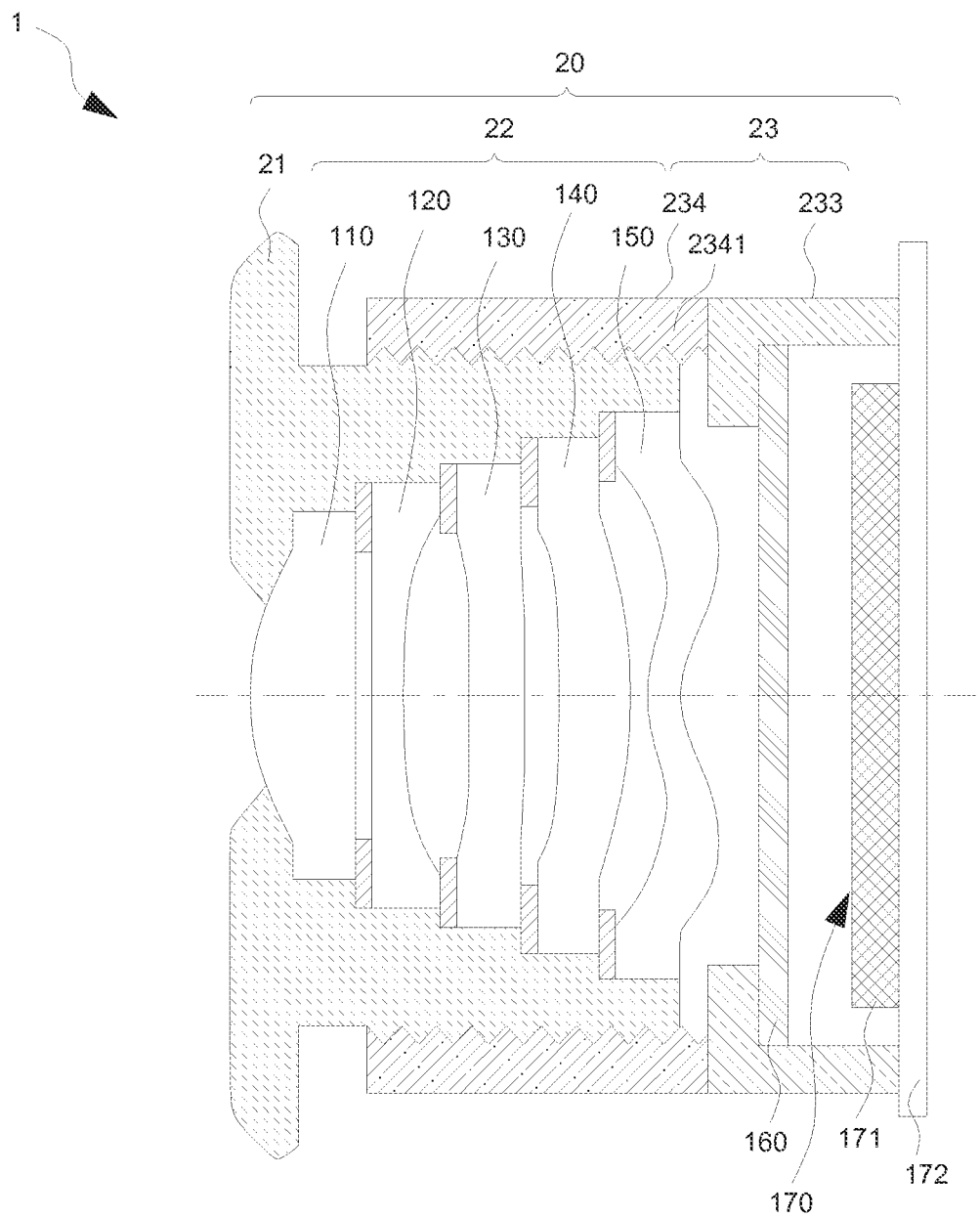
FIG. 32 shows an enlarged view of a structure of an example embodiment of a mobile device.

Reference is now made to FIGS. 31-32. FIG. 31 illustrates an example structural view of an example embodiment of mobile device 1. FIG. 32 shows an example enlarged view of the example embodiment of mobile device 1 of FIG. 31. An example of the mobile device 1 may be a mobile phone, but the type of the mobile device 1 should not be limited to such. As shown, the mobile device 1 may comprise a housing 10 and an optical imaging lens assembly 20 positioned in the housing 10. The housing 10 protects the optical imaging lens assembly 20 therein, and is not limited to any shape or material. The optical imaging lens assembly 20 may comprise a lens barrel 21, an optical imaging lens 22, a module housing unit 23, and an image sensor 171 which is positioned at an image side of the optical imaging lens 22. In example embodiments, any optical imaging lens may be used as the optical imaging lens 22, such as any optical imaging lens disclosed in the aforesaid embodiments or other optical imaging lens according to example embodiments. However, for clearly illustrating the present embodiment, the optical imaging lens of the first embodiment will be used as the optical imaging lens 22. When using other optical imaging lens 22, the structure of the filtering unit 160 may be omitted. Furthermore, the housing 10, the lens barrel 21, and/or the module housing unit 23 may be integrated into a single component or assembled by multiple components. Furthermore, the image sensor 171 used in the present embodiment is directly attached on the substrate 172 in the form of a chip on board (COB) package, and such package is different from traditional chip scale packages (CSP) since it does not require a cover glass. That is, no cover glass is required before the image sensor 171 in the optical imaging lens 22. It should be noted, however, that example embodiments are not limited to this package type. The optical imaging lens with refractive power as a whole comprises five lens elements 110, 120, 130, 140, 150 positioned in the lens barrel 21, wherein an air gap may exist between any two adjacent lens elements. The module housing unit 23 is provided for positioning the optical imaging lens 22 thereon, and preferably comprises an image sensor base 233 and an auto focus module 234. The image sensor base 233 may be fixed on the substrate 172, and the auto focus module 234 may comprise a lens seat 2341 for positioning the optical imaging lens 22. The lens seat 2341 may be capable of moving back and forth along the optical axis to control the focusing of the optical imaging lens 22. For example, according to the distance of the object, the optical imaging lens 22 may be moved back and forth until the image focuses on the image plane 170 of the image sensor 171. Because the length of the optical imaging lens 22 is merely 3.75436 (mm), the size of the mobile device 1 may be quite small with good optical characters. Therefore, the present embodiment meets the demand of smaller sized product design and the request of the market.

Figure 33:
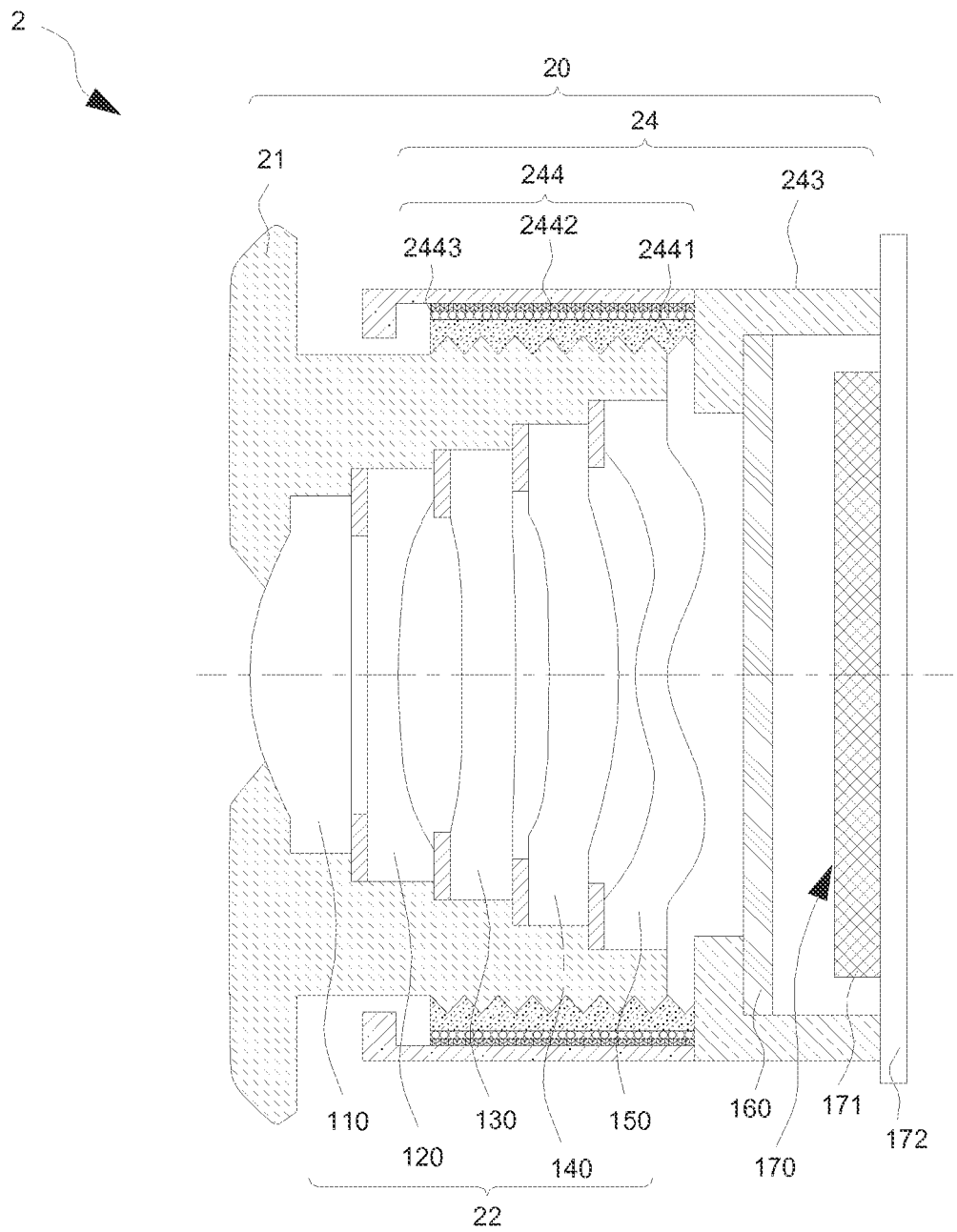
FIG. 33 shows another enlarged view of a structure of an example embodiment of a mobile device.

Reference is now made to FIG. 33, which shows a structural view of an example embodiment of mobile device 2. Here the housing is not shown, and only the optical imaging lens assembly 20 is shown. As shown, one difference between the mobile device 2 and the mobile device 1 may be the structure of the module housing unit 24. The module housing unit 24 may comprise an image sensor base 243 and an auto focus module 244, which may comprise a voice coil motor (VCM) comprising a lens seat 2441, a magnet 2442 and a coil 2443. With the magnetic force produced by the magnet 2442 and the coil 2443, the VCM may move the lens seat 2441 slightly to move the lens seat 2441 back and forth along an optical axis to focus the optical imaging lens 22. Because the length of the optical imaging lens 22 may be shortened, the mobile device 2 may be designed with a smaller size and meanwhile good optical performance is still provided. Therefore, the present embodiment meets the demand of small sized product design and the request of the market.

According to above illustration, it is clear that the mobile device and the optical imaging lens thereof in example embodiments, through controlling ratio of at least one central thickness of lens to a sum of all air gaps along the optical axis between five lens elements in a predetermined range, and incorporated with detail structure and/or reflection power of the lens elements, the lengths of the optical imaging lens is effectively shortened and meanwhile good optical characters are still provided.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens comprising, from an object side to an image side:
   an aperture stop;
   a first lens element;
   a second lens element;
   a third lens element;
   a fourth lens element; and
   a fifth lens element, each of the first, second, third, fourth and fifth lens element having an object-side surface facing toward the object side and an image-side surface facing toward the image side, wherein:
   the first lens element has a positive refracting power and the object-side surface of the first lens element has a convex portion in a vicinity of an optical axis and a convex portion near a circumference of the first lens element;
   the second lens element has a negative refracting power;

the object-side surface of the third lens element has a concave portion near a circumference of the third lens element and the image-side surface of the third lens element has a convex portion near the circumference of the third lens element;

the fourth lens element has a positive refracting power, the object-side surface of the fourth lens element has a concave portion in a vicinity of the optical axis and a concave portion near a circumference of the fourth lens element, and the image-side surface of the fourth lens element has a convex portion in a vicinity of the optical axis and a convex portion near the circumference of the fourth lens element;

the fifth lens element has a negative refracting power, the image-side surface of the fifth lens element has a concave portion in a vicinity of the optical axis and a convex portion near a circumference of the fifth lens element;

the optical imaging lens has only five lens elements having a refracting power; and the optical imaging lens satisfies the following relations:

$2.200 \leq T2/AG12 \leq 3.100;$ $0.659 \leq T2/T3 \leq 1.219;$ and $1.551 \leq ALT/AAG \leq 2.531,$ wherein T2 is a thickness of the second lens element along the optical axis, T3 is a thickness of the third lens element along the optical axis, AG12 is a width of an air gap between the first and second lens elements along the optical axis, ALT is a sum of thicknesses of the first to fifth lens elements, and AAG is a sum of widths of air gaps between the first to fifth lens elements.

2. The optical imaging lens of claim 1 wherein a ratio AG12/AG45 is between 0.137 and 1.000, wherein AG45 is a width of an air gap between the fourth and fifth lens elements along the optical axis.

3. The optical imaging lens of claim 1 wherein a ratio T1/AG12 is between 3.574 and 11.173, wherein T1 is a thickness of the first lens element along the optical axis.

4. The optical imaging lens of claim 1 wherein a ratio T4/AG45 is between 0.512 and 5.173, wherein T4 is a thickness of the fourth lens element along the optical axis and AG45 is a width of an air gap between the fourth and fifth lens elements along the optical axis.

5. The optical imaging lens of claim 1 wherein a ratio ALT/AG45 is between 2.660 and 19.219, wherein AG45 is a width of an air gap between the fourth and fifth lens elements along the optical axis.

6. The optical imaging lens of claim 1 wherein a ratio T1/T4 is between 0.868 and 1.040, wherein T1 is a thickness of the first lens element along the optical axis and T4 is a thickness of the fourth lens element along the optical axis.

7. An optical imaging lens comprising, from an object side to an image side:
an aperture stop;
a first lens element;
a second lens element;
a third lens element;
a fourth lens element; and
a fifth lens element, each of the first, second, third, fourth and fifth lens elements having an object-side surface facing toward the object side and an image-side surface facing toward the image side, wherein:
the first lens element has a positive refracting power, and the object-side surface of the first lens element has a convex portion in a vicinity of an optical axis and a convex portion near a circumference of the first lens element;

the second lens element has a negative refracting power;

the object-side surface of the third lens element has a concave portion near a circumference of the third lens element and the image-side surface of the third lens element has a convex portion near the circumference of the third lens element;

the fourth lens element has a positive refracting power, the object-side surface of the fourth lens element has a concave portion in a vicinity of the optical axis and a concave portion near a circumference of the fourth lens element, and the image-side surface of the fourth lens element has a convex portion in a vicinity of the optical axis;

the fifth lens element has a negative refracting power and the image-side surface of the fifth lens element has a concave portion in a vicinity of the optical axis and a convex portion near a circumference of the fifth lens element;

the optical imaging lens has only five lens elements having a refracting power; and the optical imaging lens satisfies the following relations:

$19.390 \leq ALT/AG12 \leq 41.996;$ $0.386 \leq AG23/AG45 \leq 1.189;$ and $0.132 \leq AG45/AAG \leq 0.398,$ wherein ALT is a sum of thicknesses of the first to fifth lens elements, AG12 is a width of an air gap between the first and second lens elements along the optical axis, AG23 is a width of an air gap between the second and third lens elements along the optical axis, AG45 is a width of an air gap between the fourth and fifth lens elements along the optical axis, and AAG is a sum of widths of air gaps between the first to fifth lens elements.

8. The optical imaging lens of claim 7 wherein a ratio AG12/AAG is between 0.053 and 0.132.

9. The optical imaging lens of claim 7 wherein a ratio AG34/AG45 is between 0.192 and 2.560, wherein AG34 is a width of an air gap between the third and fourth lens elements along the optical axis.

10. The optical imaging lens of claim 7 wherein a ratio T1/AG45 is between 0.532 and 4.826, wherein T1 is a thickness of the first lens element along the optical axis.

11. The optical imaging lens of claim 7 wherein a ratio T1/AAG is between 0.310 and 0.636, wherein T1 is a thickness of the first lens element along the optical axis.

12. The optical imaging lens of claim 7 wherein a ratio T1/T5 is between 1.053 and 1.520, wherein T1 is a thickness of the first lens element along the optical axis and T5 is a thickness of the fifth lens element along the optical axis.

13. An optical imaging lens comprising, from an object side to an image side:
an aperture stop;
a first lens element;
a second lens element;
a third lens element;
a fourth lens element; and
a fifth lens element, each of the first, second, third, fourth and fifth lens element having an object-side surface facing toward the object side and an image-side surface facing toward the image side, wherein:
the first lens element has a positive refracting power and the object-side surface of the first lens element has a convex portion in a vicinity of an optical axis and a convex portion near a circumference of the first lens element;

the second lens element has a negative refracting power;

the object-side surface of the third lens element has a concave portion near a circumference of the third lens element and the image-side surface of the third lens element has a convex portion near the circumference of the third lens element;

the fourth lens element has a positive refracting power, the object-side surface of the fourth lens element has a concave portion in a vicinity of the optical axis and a concave portion near a circumference of the fourth lens element, and the image-side surface of the fourth lens element has a convex portion in a vicinity of the optical axis;

the fifth lens element has a negative refracting power and the image-side surface of the fifth lens element has a concave portion in a vicinity of the optical axis and a convex portion near a circumference of the fifth lens element;

the optical imaging lens has only five lens elements having a refracting power; and the optical imaging lens satisfies the following relations:

$0.497 \leq T2/AG45 \leq 0.728$;

$0.132 \leq AG45/AAG \leq 0.398$;

$0.659 \leq T2/T3 \leq 1.219$; and $2.200 \leq T2/AG12 \leq 5.612$, wherein T2 is a thickness of the second lens element along the optical axis, AG45 is a width of an air gap between the fourth and fifth lens elements along the optical axis, AAG is a sum of widths of air gaps between the first to fifth lens elements, T3 is a thickness of the third lens element along the optical axis, and AG12 is a width of an air gap between the first and second lens elements along the optical axis.

14. The optical imaging lens of claim 13 wherein a ratio T5/AG45 is between 0.364 and 4.339, wherein T5 is a thickness of the fifth lens element along the optical axis.

15. The optical imaging lens of claim 13 wherein a ratio T4/AG12 is between 3.730 and 11.282, wherein T4 is a thickness of the fourth lens element along the optical axis.

16. The optical imaging lens of claim 13 wherein a ratio T5/AG12 is between 2.565 and 7.905, wherein T5 is a thickness of the fifth lens element along the optical axis.

17. The optical imaging lens of claim 13 wherein a ratio T2/T5 is between 0.507 and 1.754, wherein T5 is a thickness of the fifth lens element along the optical axis.

* * * * *